(12) United States Patent
Goodwin et al.

(10) Patent No.: US 7,780,999 B2
(45) Date of Patent: Aug. 24, 2010

(54) REDUCED PRESSURE DISTILLATION OF AN ALCOHOLIC MIXTURE

(75) Inventors: James Edward Goodwin, Jacksonville, FL (US); Les Pfahl, Ponte Vedra Beach, FL (US); Derek M. Greer, Jacksonville, FL (US); Jerome Canty, Jacksonville, FL (US)

(73) Assignee: Bacardi & Company Limited, Geneva (CH)

( * ) Notice: Subject to any disclaimer, the term of this patent is extended or adjusted under 35 U.S.C. 154(b) by 1006 days.

(21) Appl. No.: 11/446,372

(22) Filed: Jun. 1, 2006

(65) Prior Publication Data

US 2007/0281052 A1    Dec. 6, 2007

(51) Int. Cl.
    *C12C 11/00* (2006.01)
(52) U.S. Cl. .......................................... 426/11; 426/14
(58) Field of Classification Search .................. 426/11, 426/14
    See application file for complete search history.

(56) References Cited

U.S. PATENT DOCUMENTS

| 60,179 | A | 12/1866 | Haeck |
|---|---|---|---|
| 69,275 | A | 9/1867 | Turner |
| 79,616 | A | 7/1868 | Valentine |
| 280,385 | A | 7/1883 | Maus |
| 436,534 | A | 9/1890 | Metzler |
| 604,996 | A | 5/1898 | Maiche |
| 641,746 | A | 1/1900 | Wittemann |
| 851,718 | A | 4/1907 | Watt |
| 869,375 | A | 10/1907 | Lloyd |
| 1,189,127 | A | 6/1916 | Kellogg |
| 1,238,577 | A | 8/1917 | Schneible |
| 1,547,786 | A | 7/1925 | Caspar |
| 1,856,979 | A | 5/1932 | Todd |
| 1,900,694 | A | 3/1933 | Coupeau et al. |
| 2,099,864 | A | 11/1937 | Miller |
| 2,103,449 | A | 12/1937 | Crutchfield et al. |
| 2,104,243 | A | 1/1938 | Ring |
| 2,419,286 | A | 4/1947 | Rooker |
| 2,450,774 | A | 10/1948 | Zahm |
| 2,453,109 | A | 11/1948 | MacDowell et al. |

(Continued)

FOREIGN PATENT DOCUMENTS

DE    3506820 A1    8/1986

(Continued)

OTHER PUBLICATIONS

A.J.V. Underwood, "Historical Development of Distilling Plant", *Transactions. Institution Chemical Engineers*, pp. 34-62 (1935).

(Continued)

*Primary Examiner*—Keith D Hendricks
*Assistant Examiner*—Hamid R Badr
(74) *Attorney, Agent, or Firm*—Edwards, Angell, Palmer & Dodge; Philip T. Shannon; Jacob P. Martinez

(57) ABSTRACT

The present invention relates to a method for distilling an alcoholic mixture under reduced pressure, wherein a portion of the fluid alcoholic mixture is distilled at a temperature below about 0° C. such that the fluid alcoholic mixture remains fluid while distilling. The present invention further relates to condensing the alcoholic distillate with a first condenser at a first condenser temperature of from about −269° C. to about −15° C. to provide a first alcoholic condensate. The alcoholic mixtures contemplated for use according to the method of the present invention include, but are not limited to, gin, vodka, rum, or neutral spirits. The present invention also relates to an alcoholic beverage prepared by the reduced pressure distillation method of the invention.

52 Claims, 13 Drawing Sheets

U.S. PATENT DOCUMENTS

| | | | |
|---|---|---|---|
| 2,457,315 A | 12/1948 | Milleville |
| 2,513,813 A | 7/1950 | Milleville |
| 2,625,505 A | 1/1953 | Cross |
| 2,647,078 A | 7/1953 | Chambers |
| 2,773,774 A | 12/1956 | McCarthy et al. |
| 2,777,514 A | 1/1957 | Eckstrom |
| 2,957,773 A | 10/1960 | Toulmin, Jr. |
| 3,024,117 A | 3/1962 | Barlow |
| 3,418,134 A | 12/1968 | Rooker |
| 3,449,128 A | 6/1969 | Yamada et al. |
| 4,335,149 A | 6/1982 | Stipp |
| 4,347,321 A | 8/1982 | Lionelle et al. |
| 4,670,278 A | 6/1987 | Healey et al. |
| 4,784,868 A | 11/1988 | Young |
| 4,867,997 A | 9/1989 | Wiesenberger et al. |
| 4,908,219 A | 3/1990 | Modot et al. |
| 4,976,974 A | 12/1990 | Thumm |
| 5,030,473 A | 7/1991 | Ghodsizadeh |
| 5,093,141 A | 3/1992 | Nemeth et al. |
| 5,478,443 A | 12/1995 | Cogat |
| 5,955,135 A | 9/1999 | Boucher et al. |
| 6,090,427 A | 7/2000 | Mazurek et al. |
| 2006/0102007 A1* | 5/2006 | Martin .................. 99/275 |

FOREIGN PATENT DOCUMENTS

| | | |
|---|---|---|
| EP | 0078226 A1 | 5/1983 |
| EP | 0177282 A2 | 4/1986 |
| WO | WO 02/074897 A1 | 9/2002 |

OTHER PUBLICATIONS

C.S. Robinson et al., "Fractional Distillation", in *Elements of Fractional Distillation*, McGraw-Hill, pp. 204-213 and 393-402 (4$^{th}$ Ed. 1950).

J.R. Fair, "Historical Development of Distillation Equipment", *Diamond Jubilee Historical/Review Volume, AIChE Symposium Series*, Dept. Chemical Engineering, University of Texas, No. 235, vol. 79, pp. 1-14 (1968).

J.E. Bujake, "Beverage Spirits, Distilled", *Kirk-Othmer Encyclopedia of Chemical Technology*, vol. 4, pp. 153-183 (4$^{th}$ Ed. 1992).

"Manufacturing Rum", http://www.knet.co.za/psrum/manufacturing_rum.htm (Apr. 14, 2006).

\* cited by examiner

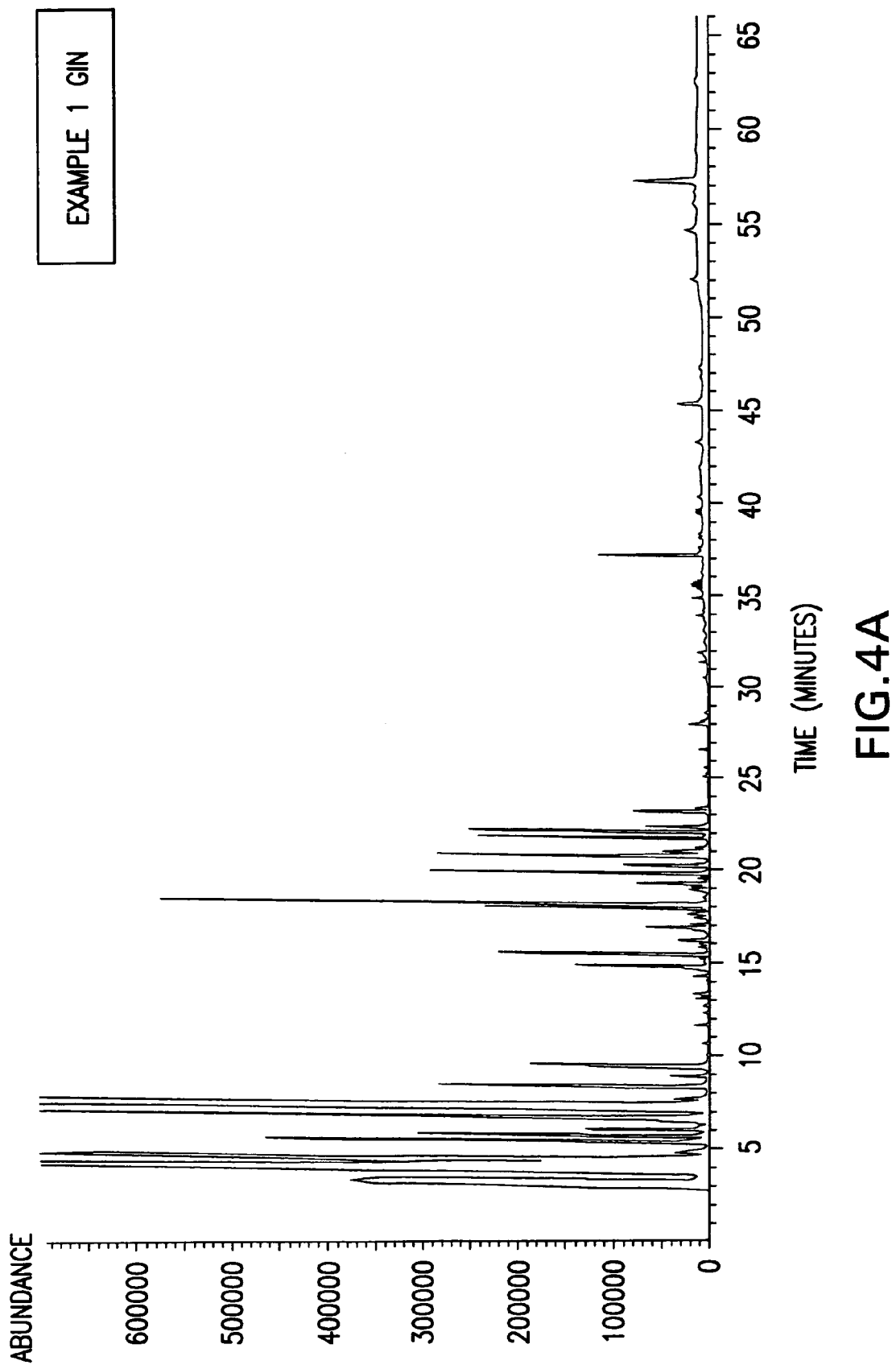

REDUCED PRESSURE DISTILLATION OF AN ALCOHOLIC MIXTURE

1. FIELD OF THE INVENTION

The present invention relates to methods for making an alcoholic beverage, e.g., gin, and the alcoholic beverage product of that method. In particular, the invention relates to methods for making an alcoholic beverage comprising, for example, distilling a mixture comprising ethanol in an evaporation apparatus by reducing the pressure within the evaporation apparatus.

2. BACKGROUND OF THE INVENTION

Many alcoholic beverages are produced using multiple-step processes comprising one or more of the steps of (1) producing ethanol by fermentation of sugars, grains, juices, or other produce; (2) distilling the product of fermentation at elevated temperatures to produce ethanolic spirits; and (3) aging the ethanolic spirits until the beverage possesses desirable flavor, aroma, and color characteristics. The commercial production of alcohol by distillation has been in widespread operation for many years. For example, the distillation of a mixture of alcohol and water has been performed using an evaporation apparatus or retort in which the mixture is heated, and a condenser into which vapor from the evaporation apparatus is passed for cooling. Additionally, it has been disclosed that London dry gin is distilled at high proof often under reduced pressure at about 57° C. to avoid thermal decomposition and enhance smoothness. J. E. Bujake, "Beverage Spirits, Distilled" in *Kirk-Othmer Encyc. of Chem. Technol.* Vol. 4, 164 (4th Ed. 1992).

Such arrangements require a heat source which contributes substantially both to the cost of the apparatus and to the cost of operating the same. Furthermore, distillations which include heating the alcoholic mixture, including mild heating, can lead to thermal degradation of the mixture's components, leading to loss of flavor of the distilled alcoholic beverage. Safety is also a concern with the use of a high temperature operation. Additionally, high temperature distillation can lead to leaching of impurities from the walls of the apparatus itself. Also, some preferred materials of construction, such as polyethylene, cannot be used at higher temperatures.

U.S. Pat. No. 851,718 to Watt discloses a process of distillation in which a fermented liquor is introduced into a boiler and heated to a temperature just sufficient to generate the "lightest vapors," 100° F to 120° F. (37.8° C. to 48.9° C.), under a vacuum varying from the "highest practicable vacuum" to approximately one-third of atmospheric pressure.

U.S. Pat. No. 1,189,127 to Kellogg discloses the use of a vacuum still and condenser for removing moisture from fruit concentrates without also removing the volatile "flavors and odors" wherein the distillation occurs at about 110° F. (43.3° C.), the resultant concentrate is then mixed into a fruit juice product.

U.S. Pat. No. 1,547,786 to Caspar discloses a distillation carried on either at or below atmospheric pressure and by applying heat.

U.S. Pat. No. 2,453,109 to MacDowell et al. discloses the preparation of citrus concentrate wherein the juice is concentrated under "vacuum" (pressure not specified) at a temperature of no higher than 80° F. (26.7° C.).

U.S. Pat. No. 2,457,315 to Milleville discloses the separation and recovery of volatile flavors from orange juice in a vapor-liquid separator maintained at 1.5" Hg (38 Torr) by a three-step process of vaporization to separate volatile flavors from the orange juice, concentration of volatile flavors by fractional distillation, and recovery of volatile flavors from the noncondensable or vent gas; modification of the flavor is alleged to be avoidable, if desired, during the first two steps by conducting them at a vacuum corresponding to an operating temperature sufficiently low so that no changes occur during the time involved in processing. Milleville further discloses that the lowest feasible operating temperature is the freezing point of "the essence," which approximates the freezing point of water.

U.S. Pat. No. 2,625,505 to Cross discloses a process for recovering volatile flavorings or "aromatic essences" by evaporating them at about 60° F. (15.6° C.) from a liquid under sub-atmospheric pressures wherein the aromatic essences to be salvaged, together with any alcohols and water which may evaporate, are delivered to a condenser; the condensate is then delivered to a series of heated stripping columns. The amount of alcohol evaporated and collected along with the aromatics essences is disclosed to be not so high as to subject Cross's process to the strict controls and regulations which are prescribed by the Federal Government (i.e., the Bureau of Alcohol, Tobacco and Firearms).

U.S. Pat. No. 2,777,514 to Eckstrom discloses the concentration by low temperature evaporation of liquid food products and pharmaceuticals wherein a refrigeration system is employed in which the evaporator of the refrigerant is used for condensing the vapors from the product evaporator directly or for cooling the water used for condensing these vapors and in which the compressed refrigerant vapors are condensed by a coolant or intermediate liquid which then is allowed to flash and thereby furnish vapors which are used to finish the necessary heat to condense the liquid which is being treated.

International publication no. WO 02/074897 A1 of Romanjek discloses a process for thickening must by boiling at lower pressure, the vapor being vacuumed by vacuum pumps.

There remains a need for alcoholic beverages of premium quality, for example, with superior nose, flavor and/or taste, and for methods of making the same. The present invention addresses these needs in its methods for making alcoholic beverages by improved distillation methods and in the improved alcoholic beverages produced thereby. In the present invention, harsh elements are reduced in the alcoholic condensate and/or the taste of the alcoholic beverage is improved.

3. SUMMARY OF THE INVENTION

The present invention is directed to methods for distilling an alcoholic mixture. In one embodiment, the invention relates to a method of distilling an alcoholic mixture, comprising:

(a) reducing the pressure in a distillation vessel containing a fluid alcoholic mixture;

(b) distilling at least a portion of the fluid alcoholic mixture at a fluid alcoholic mixture temperature below about 0° C. such that the fluid alcoholic mixture remains fluid while distilling to provide an alcoholic distillate; and (c) condensing at least a portion of the alcoholic distillate with a first condenser at a first condenser temperature of from about −269° C. to about −15° C. to provide a first alcoholic condensate.

In another embodiment, the invention relates to a method of distilling an alcoholic mixture, wherein at least about 75 wt. % of the fluid alcoholic mixture is distilled at a fluid alcoholic mixture temperature below about 0° C. In another embodiment, at least about 90 wt. % of the fluid alcoholic mixture is distilled at a fluid alcoholic mixture temperature below about 0° C.

In another embodiment, the pressure within the distillation vessel while distilling is from about 0.1 Torr to about 42 Torr. In another embodiment, the pressure within the distillation vessel while distilling is from about 0.1 to about 2 Torr.

In one embodiment of the present invention, at least a portion of the fluid alcoholic mixture is distilled at a fluid alcoholic mixture temperature of from about −35° C. to about 0° C. In another embodiment, the fluid alcoholic mixture temperature is decreased while distilling. In another embodiment, sufficient heating is provided to the fluid alcoholic mixture to keep the fluid alcoholic mixture fluid while distilling.

In one embodiment, the method of the invention is a batch method. In another embodiment, the method is continuous.

In one embodiment, the first condenser temperature is from about −269° C. to about −25° C. In another embodiment, the first condenser temperature is from about −80° C. to about −30° C. In another embodiment, the first condenser temperature is from about −45° C. to about −30° C. In another embodiment, the first condenser temperature is about −196° C.

In one embodiment, a second condenser having a second condenser temperature is used, which provides a second alcoholic condensate, wherein the alcoholic distillate contacts the first condenser before contacting the second condenser. In another embodiment, the first condenser temperature and the second condenser temperature are each about −196° C. In another embodiment, the second condenser temperature is below the first condenser temperature. In another embodiment, the first condenser temperature is from about −80° C. to about −25° C. In another embodiment, the second condenser temperature is from about −269° C. to about −30° C. In another embodiment, the second condenser temperature is from about −80° C. to about −30° C. In another embodiment, the second condenser temperature is about −196° C.

In one embodiment of the present invention, the first alcoholic condensate is packaged to provide an alcoholic beverage. In another embodiment, the first alcoholic condensate and the second alcoholic condensate are combined to form a combined alcoholic condensate and the combined alcoholic condensate is packaged to provide an alcoholic beverage.

The present invention is further directed to a method for distilling an alcoholic mixture, comprising:
(a) reducing the pressure in a distillation vessel containing a fluid alcoholic mixture such that the pressure within the distillation vessel while distilling is from about 0.1 Torr to about 2 Torr;
(b) distilling at least a portion of the fluid alcoholic mixture at a fluid alcoholic mixture temperature of from about −35° C. to about 0° C. to provide an alcoholic distillate; and
(c) condensing the alcoholic distillate with a first condenser at a first condenser temperature of from about −196° C. to about −25° C. to provide a first alcoholic condensate.

In one embodiment, at least about 90 wt. % of the fluid alcoholic mixture is distilled at a fluid alcoholic mixture temperature below about 0° C. In another embodiment, the fluid alcoholic mixture comprises at least one flavorant, flavorant extract, colorant, colorant extract, blending material, blending material extract, essential oil, essential oil extract, or any combination thereof. In another embodiment, the at least one flavorant is juniper berries or the at least one flavorant extract is juniper berry extract. In other embodiments, the fluid alcoholic mixture comprises or is gin, vodka, rum, neutral spirits, or any combination thereof. In another embodiment, the first alcoholic condensate is packaged to provide an alcoholic beverage.

In embodiments of the present invention comprising a second condenser having a second condenser temperature which provides a second alcoholic condensate, in one embodiment the first condenser temperature is from about −50° C. to about −30° C. In another embodiment, the second condenser temperature is from about −196° C. to about −30° C. In another embodiment, the first alcoholic condensate and the second alcoholic condensate are combined to form a combined alcoholic condensate and the combined alcoholic condensate is packaged to provide an alcoholic beverage.

The present invention is further directed to use of a method of the present invention to obtain any one or a combination of alcoholic beverages, as defined by the Bureau of Alcohol, Tobacco and Firearms Division of the U.S. Treasury Department. In other embodiments, the present invention relates to the alcoholic condensate and/or alcoholic beverage product of any of the reduced pressure methods herein for making it.

The present invention can be understood more fully by reference to the following figures, detailed description and examples, which are intended to exemplify non-limiting embodiments of the invention.

4. BRIEF DESCRIPTION OF THE DRAWINGS

5. DETAILED DESCRIPTION OF THE INVENTION

Distillation is a known process for purifying a substance and involves vaporizing a substance, condensing the vapor and collecting the purified substance as a condensate. It is an important method used for purifying a liquid. Distillation is useful for, e.g., separating a mixture when the components have different boiling points. Several kinds of distillation techniques for binary and/or multi-component mixtures are known and practiced in the art, for example: (1) simple, (2) vacuum or reduced pressure, (3) fractional and (4) steam distillation. Vacuum distillation may sometimes also be referred to as "molecular" or "short path" distillation. The reduced pressure distillation of an alcoholic mixture of the present invention is advantageous in that it, inter alia, improves the quality of the alcoholic condensate and/or the efficiency of distillation, especially when alcoholic mixtures with high boiling temperatures are present and/or where thermally sensitive components are present.

Reduced pressure distillations known in the art use elevated temperatures, e.g., at least about 50-60° C., which can lead to condensate flavor degradation. The methods of reduced pressure distillation according to the present invention significantly reduce the above-ambient to high temperatures that are required in conventional distillations of an alcoholic mixture. By conducting the distillation of alcoholic mixtures at reduced pressure pursuant to the present invention, the temperatures required can be lower than those required in conventional distillations performed at ambient, e.g., atmospheric, pressure. For example, in a reduced pressure distillation of the present invention, the temperature of the fluid alcoholic mixture is kept at or below the temperature at which it is introduced into the evaporation apparatus, usually about 25° C. or below. Under these lower-temperature distillation conditions, the undesirable chemical reactions that may occur upon heating, gin, for example, in which botanicals, flavorants and/or their extracts are present, can be avoided. The reduced temperatures of the present reduced pressure distillation also provides the advantage of reducing heat loss from the system. Further, reduced temperatures of the present reduced pressure distillation may avoid the need to preheat an alcoholic mixture and/or provide heat within the distillation apparatus.

Figure 1:
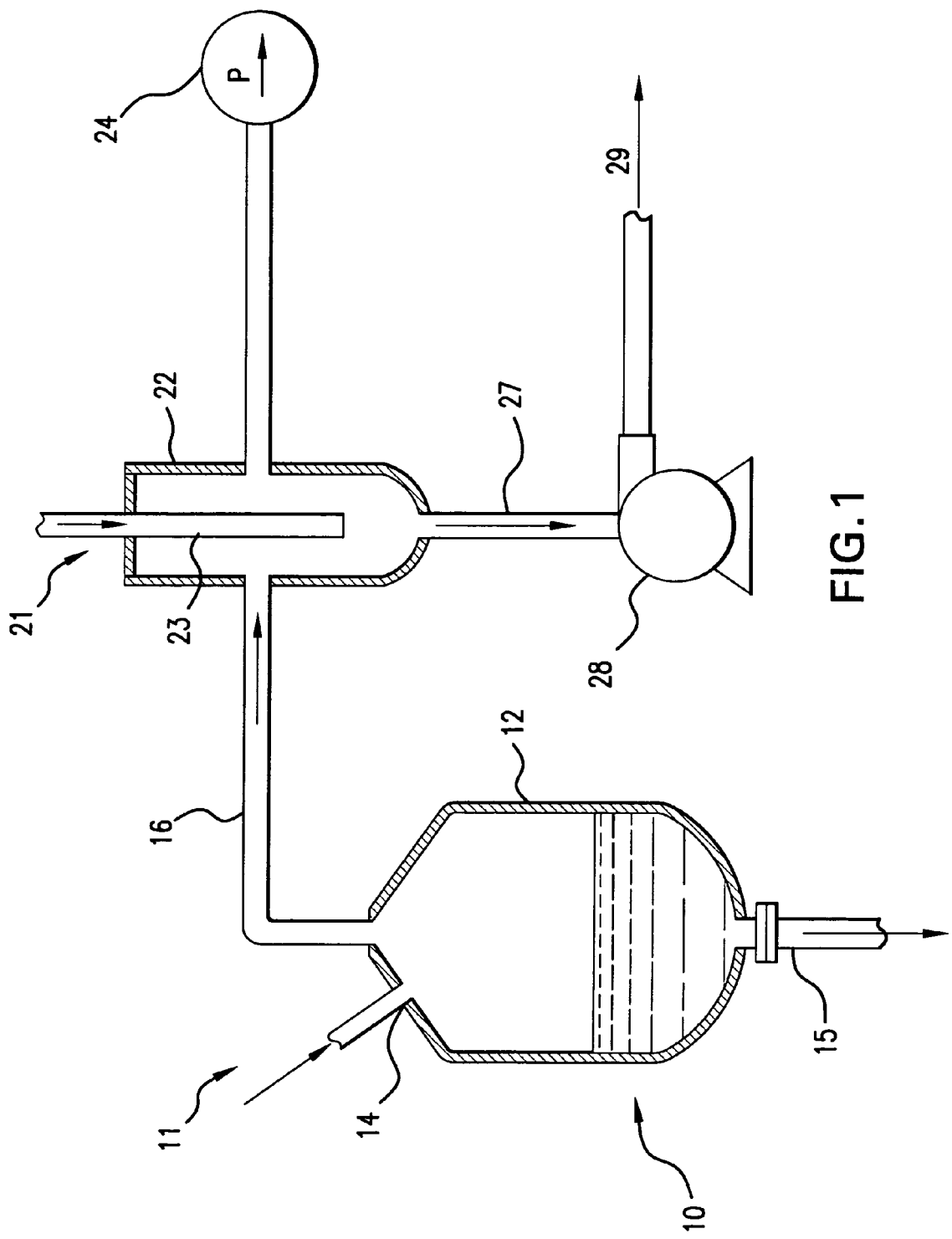
FIG. 1 depicts schematically a plan view of an exemplary embodiment of the invention where an alcoholic mixture is distilled in a reduced pressure evaporation apparatus with a single condenser.
Figure 2A:
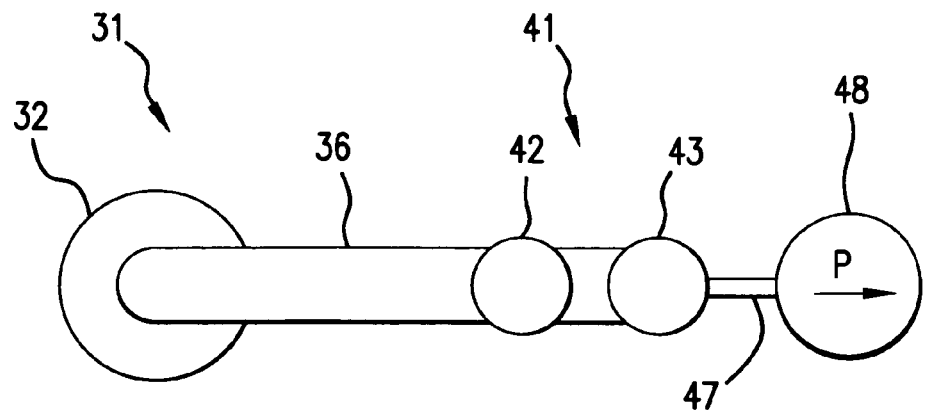
FIG. 2A depicts schematically a top view of an exemplary embodiment of the invention where an alcoholic mixture is distilled in a reduced pressure evaporation apparatus with dual condensers.
Figure 2B:
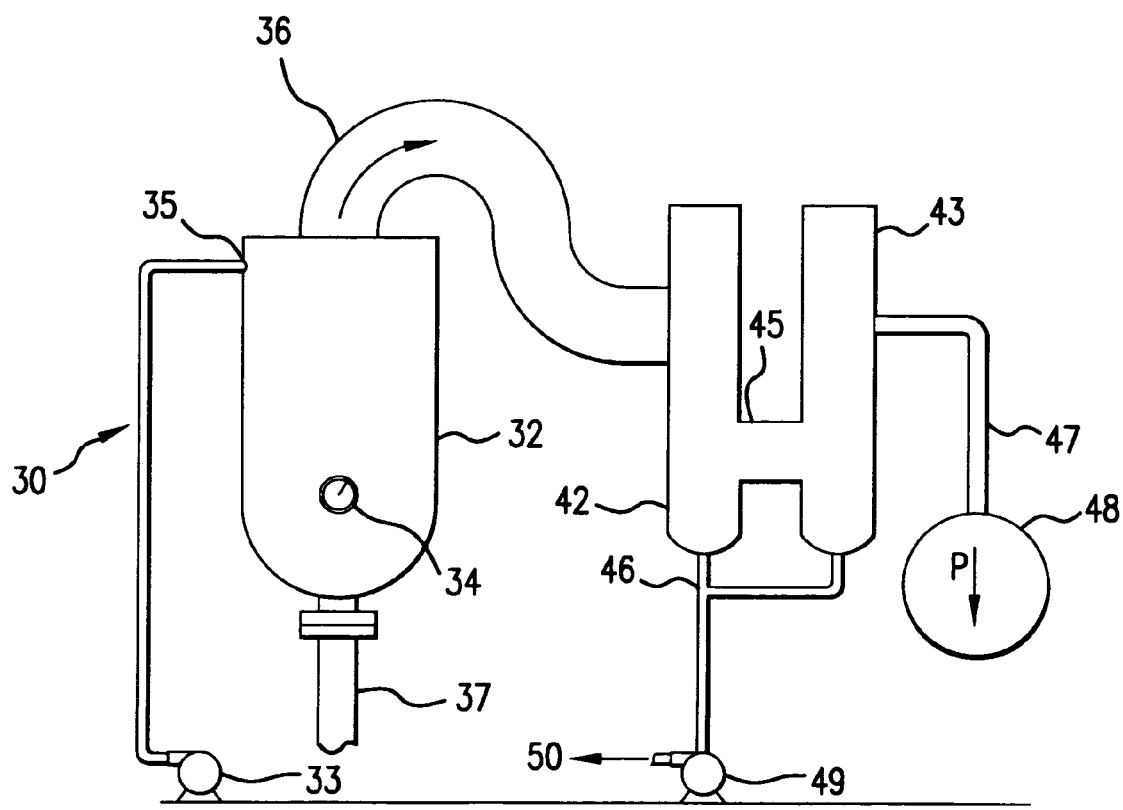
FIG. 2B depicts schematically a plan view of an exemplary embodiment of the invention where an alcoholic mixture is distilled in a reduced pressure evaporation apparatus with dual condensers.

In one embodiment, a system embodying the present invention comprises both an evaporation apparatus, e.g., 11 in FIG. 1 and 31 in FIG. 2, and a condensation apparatus, e.g., 21 in FIG. 1 and 41 in FIG. 2. The evaporation apparatus evaporates a portion of the alcoholic mixture and the resulting alcoholic distillate is cooled and condensed in the condensation apparatus for recovery as an alcoholic condensate. The evaporation apparatus may comprise a still or an equivalent vessel or tank, such as a distillation vessel, for example. The evaporation apparatus contemplated for use in the present invention can be any type of apparatus used for evaporating a liquid known to one of skill in the art, for example, a substantially vertically-oriented evaporation apparatus, e.g., as depicted by 12 in FIG. 1 and 32 in FIG. 2. Other non-limiting evaporation apparatuses include a pot still, solar still, reflux still, coffee still, alembic still, retort still and the like.

In one embodiment, the evaporation apparatus has double walls in order to be better able to accommodate in excess of about 1135 L (about 300 gallons) of fluid alcoholic mixture under reduced pressure. In another embodiment, the evaporation apparatus comprises a heat jacket such that temperatures falling below the freezing point of the fluid alcoholic mixture inside the vessel can be avoided by supplying heat, as discussed in more detail below. In another embodiment, at least a portion of evaporation apparatus wall comprises glassware that is see-through. In another embodiment, the material from which the evaporation apparatus is made comprises polyethylene.

In one embodiment, the evaporation apparatus further comprises a means for supplying the starting alcoholic mixture thereto and ascertaining its level, thereby aiding in having the desired amount of alcoholic mixture in the evaporation apparatus throughout. For example, an inlet port is provided, such as pipe 14 in FIG. 1 and pipe 35 and a feed pump 33 in FIG. 2, and a level device for detecting the level of fluid therein is provided, for example liquid gauge 34 in FIG. 2. The evaporation apparatus operates under an environment reduced in pressure relative to atmospheric pressure, e.g., as generated by vacuum pump 24 and 48 in FIGS. 1 and 2, respectively. Therefore, in another embodiment a means for isolating the atmosphere in the distillation vessel from the atmosphere in, e.g., the inlet port, is provided. This can be any such apparatus known in the art, including a valve, a check valve, a one-way valve, a removable cover, or the like.

In one embodiment, at least one exit from the distillation vessel, e.g., drain 15 in FIG. 1 and 37 in FIG. 2, is provided. In another embodiment, the exit is near the bottom of the distillation vessel. The exit is normally closed with a means for doing so known in the art, e.g., a valve, a check valve, a one-way valve, a removable cover, or the like. The exit is closed so that, e.g., the alcoholic mixture can remain in the distillation vessel and/or reduced pressure may be maintained inside the distillation vessel, but it may be opened, e.g., for cleaning, maintenance, removing residual alcoholic mixture, solids, sediment, sludge, and the like. A connection, e.g., conduit 16 and 36 in FIGS. 1 and 2, respectively, is in fluid communication with and directs alcoholic distillate from the evaporation apparatus to the condensation apparatus, e.g., condenser assembly 21 and 41 in FIGS. 1 and 2, respectively.

In one embodiment, the condensation apparatus has a condensation chamber or condenser(s), e.g., 22 in FIG. 1 and 42 and 43 in FIG. 2, to receive, cool and condense the alcoholic distillate to an alcoholic condensate. The condensation apparatus is in fluid communication with the connection. In another embodiment, the condensation apparatus is located in close proximity to the evaporation apparatus, thereby minimizing the potential for condensation in the connection and promoting efficient operation. The condensation apparatus may comprise a single or a plurality of condensation chambers, e.g., the single condenser 22 in FIG. 1 or the dual condensers 42 and 43 in FIG. 2 which are in fluid communication through a bridge, e.g., pipe 45 in FIG. 2. In other embodiments, a condensation member(s) is the site within a condensation chamber where the alcoholic distillate is condensed to an alcoholic concentrate. A condensation member can take the form of, for example, a cold finger, a cold trap, a baffle, a plate, any combination thereof, or any other structure known to one of skill in the art. Methods for achieving the desired temperature of a condensation member are discussed below.

In one embodiment, at least one exit from each condensation chamber, e.g., tube 27 in FIG. 1 and tube assembly 46 in FIG. 2, is provided. As the condensation apparatus operates under reduced pressure, in another embodiment a means for isolating the atmosphere in each condensation chamber from the atmosphere in, e.g., the exit therefrom, is provided. This can be any such apparatus known in the art, including a valve, a check valve, a one-way valve, a removable cover, or the like. In another embodiment, the alcoholic condensate is drained from a condensation chamber under the influence of gravity. In another embodiment, an exit may be connected to an assisting means, e.g., product pump 28 in FIG. 1 and 49 in FIG. 2, for carrying the alcoholic condensate away from the condensation apparatus.

Depending on the type and performance of the reduced pressure system, it can lower the boiling point of some alcoholic mixtures, for example, by about 25° C. (about 45° F.) or more. The present invention is not limited to any particular form of generating a reduced pressure. Any reduced pressure generating means known to one of skill in the art may be used, for example, a steam ejector, a venturi vacuum generator, and/or at least one type of vacuum pump, such as a mechanical vacuum pump, rotary vane pump, diffusion pump, turbomolecular pump, ion pump, titanium sublimation pump and combinations of two or more vacuum pumps which may include a plurality of the same type or more than one type. According to the teachings of the present invention, the reduced pressure generating means creates a negative pressure differential (relative to atmospheric) in a self-contained apparatus. This means that, for an evaporation apparatus containing an alcoholic mixture, the reduced pressure generating means creates a reduced pressure in the evaporation apparatus and condensation apparatus throughout the distillation, with the possible exceptions of the brief period when the apparatus is being filled and/or at the conclusion of the distillation.

In one embodiment of the present invention, the alcoholic mixture is distilled under reduced pressure in a "batch mode," e.g., as described in certain examples below. In batch mode, when the distillation is halted the pressure in the system is restored to about atmospheric pressure, any alcoholic mixture remaining in the evaporation apparatus is removed, the evaporation apparatus is recharged with alcoholic mixture starting material, and the method is repeated as desired.

In another embodiment of the present invention, the alcoholic mixture is distilled under reduced pressure in a "continuous mode." This mode may be particularly advantageous for applications where large quantities of alcoholic mixture are to be handled. In such units, the reduced pressure system maintains a negative pressure differential (relative to atmospheric) in the evaporation and condensation apparatuses and atmospheric pressure or a positive pressure in the newly condensed clean alcoholic mixture line. This allows, for example, 1500 L of the starting alcoholic mixture to be distilled without interruption or down time. In the continuous mode of operation, a starting alcoholic mixture is drawn automatically through the inlet port, e.g., 35 shown in FIG. 2b. In one embodiment, an evaporation apparatus is initially filled to its rated capacity (for example, about 24 L or about 1135 L) and the level device is used to detect changes in the level of alcoholic mixture in the evaporation apparatus. As the distillation progresses and the alcoholic mixture is converted to alcoholic distillate, a decrease in the alcoholic mixture level detected by the level device can trigger a system controller to replenish the alcoholic mixture through the inlet port. In another embodiment of the present invention, the replenishment can be assisted by pumping the liquid using any pump known to one of skill in the art.

According to the present invention, there is provided a reduced pressure distillation apparatus comprising an evaporation apparatus comprising a distillation vessel having a connection to a condensation apparatus wherein, during operation under reduced pressure, the alcoholic distillate produced in the distillation vessel exits through the connection, contacts at least one condensation member in at least one condenser of the condensation apparatus, and condenses to form an alcoholic condensate.

In one embodiment of the present invention, the pressure within the distillation vessel while distilling is at least about 0.0001 Torr. In another embodiment, the pressure within the distillation vessel while distilling is at least about 0.001 Torr. In another embodiment, the pressure within the distillation vessel while distilling is at least about 0.01 Torr. In another embodiment, the pressure within the distillation vessel while distilling is at least about 0.04 Torr. In another embodiment, the pressure within the distillation vessel while distilling is at least about 0.07 Torr. In another embodiment, the pressure within the distillation vessel while distilling is at least about 0.1 Torr.

In another embodiment, the pressure within the distillation vessel while distilling is about 100 Torr or less. In another embodiment, the pressure within the distillation vessel while distilling is about 70 Torr or less. In another embodiment, the pressure within the distillation vessel while distilling is about 42 Torr or less. In another embodiment, the pressure within the distillation vessel while distilling is about 30 Torr or less. In another embodiment, the pressure within the distillation vessel while distilling is about 20 Torr or less. In another embodiment, the pressure within the distillation vessel while distilling is about 15 Torr or less. In another embodiment, the pressure within the distillation vessel while distilling is about 8 Torr or less. In another embodiment, the pressure within the distillation vessel while distilling is about 4 Torr or less. In another embodiment, the pressure within the distillation vessel while distilling is about 2 Torr or less.

In another embodiment, the pressure within the distillation vessel while distilling is from about 0.01 Torr to about 100 Torr. In another embodiment, the pressure within the distillation vessel while distilling is from about 0.04 Torr to about 70 Torr. In another embodiment, the pressure within the distillation vessel while distilling is from about 0.1 Torr to about 42 Torr. In another embodiment, the pressure within the distillation vessel while distilling is from about 0.1 Torr to about 30 Torr. In another embodiment, the pressure within the distillation vessel while distilling is from about 0.1 Torr to about 20 Torr. In another embodiment, the pressure within the distillation vessel while distilling is from about 0.1 to about 15 Torr. In another embodiment, the pressure within the distillation vessel while distilling is from about 0.1 to about 8 Torr. In another embodiment, the pressure within the distillation vessel while distilling is from about 0.1 to about 4 Torr. In another embodiment, the pressure within the distillation vessel while distilling is from about 0.1 to about 2 Torr.

In one embodiment, an alcoholic mixture may be supplied to the evaporation apparatus at a fluid alcoholic mixture temperature of about ambient temperature, e.g., from about 15° C. to about 30° C. In another embodiment, an alcoholic mixture is cooled to about 10° C. prior to being supplied to the evaporation apparatus. In another embodiment, an alcoholic mixture is cooled to about 5° C. prior to being supplied to the evaporation apparatus. In another embodiment, an alcoholic mixture is cooled to about 0° C. prior to being supplied to the evaporation apparatus. In another embodiment, an alcoholic mixture is cooled to about −5° C. prior to being supplied to the evaporation apparatus. In another embodiment, an alcoholic mixture is cooled to about −10° C. prior to being supplied to the evaporation apparatus. In another embodiment, an alcoholic mixture is cooled to about −15° C. prior to being supplied to the evaporation apparatus. In another embodiment, an alcoholic mixture is cooled to about −20° C. prior to being supplied to the evaporation apparatus. In another embodiment, an alcoholic mixture is cooled to about −25° C. prior to being supplied to the evaporation apparatus.

In another embodiment, as the pressure in the evaporation apparatus is reduced, the fluid alcoholic mixture temperature begins to fall or decrease during the distillation. For example, the fluid alcoholic mixture temperature can fall to below about 0° C. as the reduced pressure distillation progresses. Thus, at least a portion of the alcoholic mixture is distilled under reduced pressure at a fluid alcoholic mixture temperature below about 0° C. In another embodiment, at least a portion of the fluid alcoholic mixture is distilled at a fluid alcoholic mixture temperature of from about 0° C. to about −35° C. In another embodiment, once the temperature of the alcoholic mixture falls below 0° C., at no stage thereafter of the reduced pressure distillation is the fluid alcoholic mixture temperature above 0° C.

In one embodiment, the present invention relates to a method of distilling an alcoholic mixture, comprising distilling at least a portion of the alcoholic mixture at a fluid alcoholic mixture temperature below about 0° C. such that the fluid alcoholic mixture remains fluid while distilling to provide an alcoholic distillate. For example, if an alcoholic mixture is supplied to the evaporation apparatus at a fluid alcoholic mixture temperature of about 30° C., then at least a portion of the alcoholic mixture may be distilled at a temperature of above about 0° C. until, as distillation progresses, the fluid alcoholic mixture temperature decreases to below about 0° C. In another embodiment, the invention relates to a method of distilling an alcoholic mixture, wherein at least about 75 wt. % of the fluid alcoholic mixture is distilled at a fluid alcoholic mixture temperature below about 0° C. In another embodiment, at least about 90 wt. % of the fluid alcoholic mixture is distilled at a fluid alcoholic mixture temperature below about 0° C. In another embodiment, at least about 95 wt. % of the fluid alcoholic mixture is distilled at a fluid alcoholic mixture temperature below about 0° C. In another embodiment, at least about 97 wt. % of the fluid alcoholic mixture is distilled at a fluid alcoholic mixture temperature below about 0° C. In another embodiment, at least about 99 wt. % of the fluid alcoholic mixture is distilled at a fluid alcoholic mixture temperature below about 0° C.

Real time monitoring and/or recording of the pressure and/or fluid alcoholic mixture temperature within the evaporation apparatus of the present invention can be accomplished by any method known in the art. For example, real time recording of the temperature and pressure within the evaporation apparatus is conducted during one embodiment of the present invention where the temperature of the starting alcoholic mixture is about ambient temperature, e.g., about 25° C.; after the pressure is reduced the fluid alcoholic mixture temperature falls to about −33° C. over time.

In another embodiment, sufficient heating is provided to the fluid alcoholic mixture to keep the fluid alcoholic mixture fluid, e.g., unfrozen, while distilling. Sufficient heating may be provided by any means known to one in the art, including for example a chilled water jacket, a steam jacket and/or an immersion heating coil. In another embodiment of the present invention, a means for preventing the freezing of the alcoholic mixture in the evaporation apparatus is used including, for example, using a see-through evaporation apparatus, such that it is possible to visually observe and monitor the fluid alcoholic mixture. In another embodiment, at least a portion of the evaporation apparatus is made of glassware.

In one embodiment, sufficient heat is added such that the fluid alcoholic mixture is kept at about 1° C. or more above the temperature at which the fluid alcoholic mixture would freeze. In another embodiment, the fluid alcoholic mixture is kept at about 2° C. or more above the temperature at which the fluid alcoholic mixture would freeze. In another embodiment, the fluid alcoholic mixture is kept at about 5° C. or more above the temperature at which the fluid alcoholic mixture would freeze. In another embodiment, the fluid alcoholic mixture is kept at about 10° C. or more above the temperature at which the fluid alcoholic mixture would freeze. In another embodiment, the fluid alcoholic mixture is kept at about 15° C. or more above the temperature at which the fluid alcoholic mixture would freeze. In another embodiment, the fluid alcoholic mixture is kept at about 20° C. or more above the temperature at which the fluid alcoholic mixture would freeze. In another embodiment, the fluid alcoholic mixture is kept at about 25° C. or more above the temperature at which the fluid alcoholic mixture would freeze. For example, according to embodiments of the present invention, during reduced pressure distillation, the temperature of the fluid alcoholic mixture in the distillation vessel is kept at about −25° C. or higher, or kept at about −30° C. or higher, or kept at about −32° C. or higher, or kept at about −33° C. or higher.

In one embodiment, the invention relates to a method of distilling an alcoholic mixture comprising condensing at least a portion of the alcoholic distillate with a first condenser at a first condenser temperature of from about −269° C. to about −15° C. to provide a first alcoholic condensate. In another embodiment, the first condenser temperature is from about −269° C. to about −25° C. In another embodiment, the first condenser temperature is from about −269° C. to about −30° C. In another embodiment, the first condenser temperature is from about −80° C. to about −25° C. In another embodiment, the first condenser temperature is from about −80° C. to about −30° C. In another embodiment, the first condenser temperature is from about −45° C. to about −25° C. In another embodiment, the first condenser temperature is from about −45° C. to about −30° C. In another embodiment, the first condenser temperature is about −196° C. In one embodiment, a second condenser having a second condenser temperature is used which provides a second alcoholic condensate, wherein the alcoholic distillate contacts the first condenser before contacting the second condenser. In another embodiment, the second condenser temperature is from about −269° C. to about −30° C. In another embodiment, the second condenser temperature is from about −80° C. to about −30° C. In another embodiment, the second condenser temperature is about −196° C.

In another embodiment, the first condenser temperature and the second condenser temperature are each about −196° C. In another embodiment, the second condenser temperature is below the first condenser temperature. In another embodiment, the first condenser temperature is from about −269° C. to about −25° C. and the second condenser temperature is from about −269° C. to about −30° C. In another embodiment, the first condenser temperature is from about −269° C. to about −25° C. and the second condenser temperature is from about −80° C. to about −30° C. In another embodiment, the first condenser temperature is from about −269° C. to about −25° C. and the second condenser temperature is about −196° C. In another embodiment, the first condenser temperature is from about −80° C. to about −25° C. and the second condenser temperature is from about −269° C. to about −30° C. In another embodiment, the first condenser temperature is from about −80° C. to about −25° C. and the second condenser temperature is from about −80° C. to about −30° C. In another embodiment, the first condenser temperature is from about −80° C. to about −25° C. and the second condenser temperature is about −196° C. In another embodiment, the first condenser temperature is from about −45° C. to about −25° C. and the second condenser temperature is from about −269° C. to about −30° C. In another embodiment, the first condenser temperature is from about −45° C. to about −25° C. and the second condenser temperature is from about −80° C. to about −30° C. In another embodiment, the first condenser temperature is from about −45° C. to about −25° C. and the second condenser temperature is about −196° C.

Figure 2C:
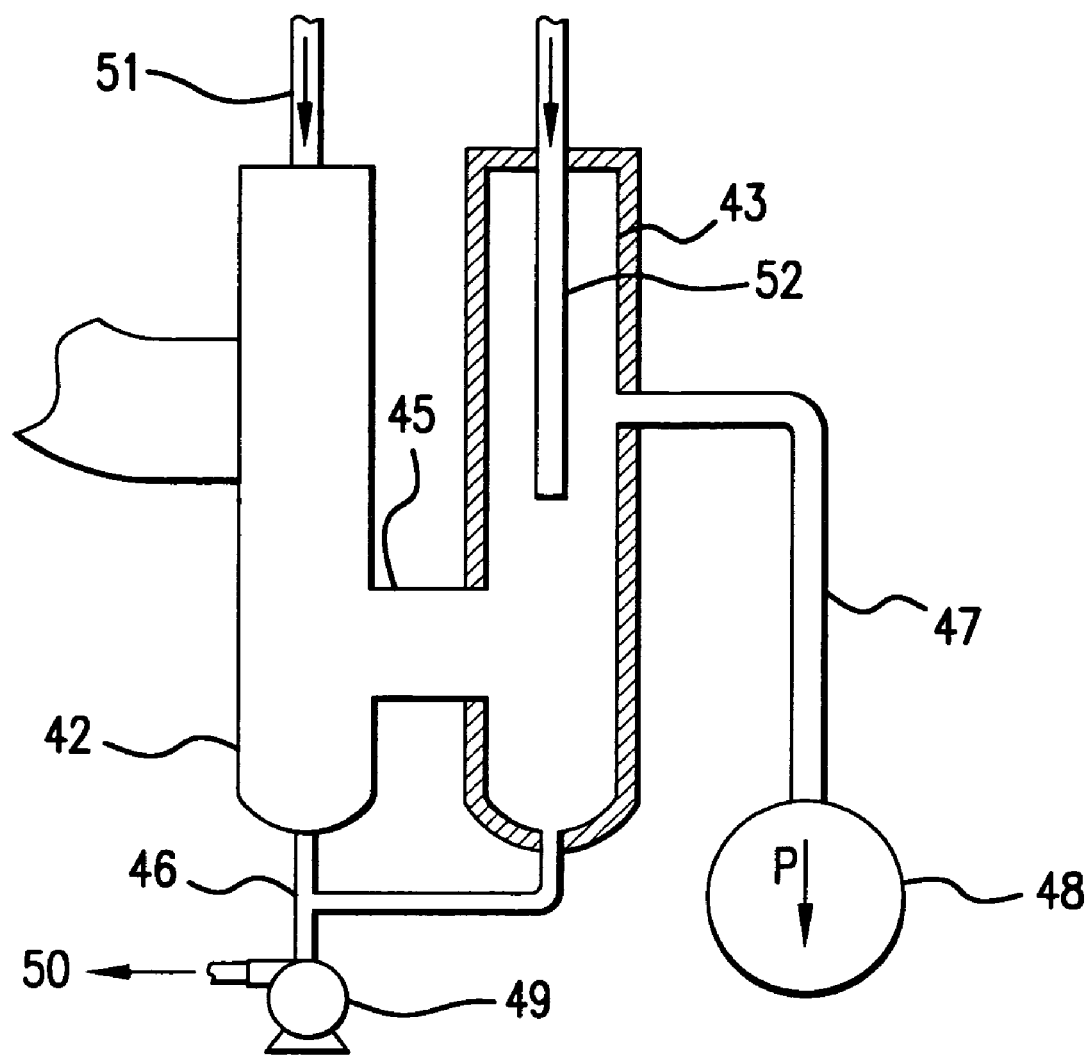
FIG. 2C depicts schematically the dual condensers of FIG. 2B having cold fingers/traps.

According to one embodiment of the present invention, the output from a chiller is used in the first condenser, e.g., flowing into cold finger 51 in FIG. 2C, where much of the condensation occurs, to provide a means for condensing the alcoholic distillate to a first alcoholic condensate. As known to the art, a chiller comprises a recirculation system for, for example, acetone, glycol, or any combination thereof, or another means that keep the first condenser temperature from about −35° C. to about −80° C. In another embodiment, a liquid nitrogen trap or "liquid nitrogen cold finger" is used in the second condenser, e.g., cold finger 52 in FIG. 2C, to provide a means for condensing the alcoholic distillate to a second alcoholic condensate. In another embodiment, a liquid helium trap or "liquid helium cold finger" is used in the second condenser to provide a means for condensing the alcoholic distillate to a second alcoholic condensate. In another embodiment, a liquid nitrogen cold finger is used in the first condenser to provide a means for condensing the alcoholic distillate to a first alcoholic condensate. In another embodiment, a liquid helium cold finger is used in the first condenser to provide a means for condensing the alcoholic distillate to a first alcoholic condensate. In another embodiment, the output from a chiller is used in the second condenser to keep the second condenser temperature from about −35° C. to about −80° C.

In another embodiment, the output from a chiller is used in the first condenser to keep the first condenser temperature from about −35° C. to about −80° C. and a liquid nitrogen cold finger is used in the second condenser. In another embodiment, a liquid nitrogen cold finger is used in the first condenser and the output from a chiller is used in the second condenser to keep the second condenser temperature from about −35° C. to about −80° C. In another embodiment, a liquid nitrogen cold finger is used in the first condenser and in the second condenser to provide a means for condensing the alcoholic distillate to a first and second alcoholic condensate, respectively. In another embodiment, the output from a chiller is used in the first condenser and second condenser to keep their respective temperatures, independently, from about −35° C. to about −80° C.

In another embodiment where a single condenser is used, the output from a chiller is used in the condenser, e.g., flowing into cold finger 23 in FIG. 1, to keep the condenser temperature from about −35° C. to about −80° C. In another embodiment where a single condenser is used, a liquid nitrogen cold finger is used in the condenser to provide a means for condensing the alcoholic distillate to a alcoholic condensate. In another embodiment where a single condenser is used, a liquid helium cold finger is used in the condenser to provide a means for condensing the alcoholic distillate to a alcoholic condensate.

In one embodiment of the present invention, the head, light or earliest-collected alcoholic condensate fraction, as used herein the "light" fraction, is segregated from the alcoholic condensate collected thereafter. In another embodiment, the light fraction comprises up to about the first 20 wt. % based on the starting weight of the fluid alcoholic mixture being distilled. In another embodiment, the light fraction comprises up to about the first 10 wt. % of the fluid alcoholic mixture being distilled. In another embodiment, the light fraction comprises up to about the first 5 wt. % of the fluid alcoholic mixture being distilled. In another embodiment, the light fraction comprises up to about the first 2 wt. % of the fluid alcoholic mixture being distilled.

In another embodiment, the tail, heavy or latest-collected alcoholic condensate fraction, as used herein the "heavy" fraction, is segregated from the earlier-collected alcoholic condensate. In another embodiment, the heavy fraction comprises up to about the final 20 wt. % based on the starting weight of the fluid alcoholic mixture being distilled. In another embodiment, the heavy fraction comprises up to about the final 10 wt. % of the fluid alcoholic mixture being distilled. In another embodiment, the heavy fraction comprises up to about the final 5 wt. % of the fluid alcoholic mixture being distilled. In another embodiment, the heavy fraction comprises up to about the final 2 wt. % of the fluid alcoholic mixture being distilled.

In another embodiment, the light fraction comprises up to about the first 5 wt. % of the fluid alcoholic mixture being distilled and the heavy fraction comprises up to about the final 5 wt. % of the fluid alcoholic mixture being distilled. In another embodiment, light fraction and the heavy fraction are segregated from the other alcoholic condensate. In other embodiments, the head and/or tail fraction is recycled to the fluid alcoholic mixture. In other embodiments, the tail fraction is optionally sieved before being recycled to the fluid alcoholic mixture. In any of these embodiments, if multiple condensers are present, the light fraction segregated and/or recycled can be collected from one condenser, from all condensers, or from any combination of condensers. In any of these embodiments, if multiple condensers are present, the heavy fraction segregated and/or recycled can be collected from one condenser, from all condensers, or from any combination of condensers.

The present invention is further directed to a method for distilling an alcoholic mixture, comprising:
   (a) reducing the pressure in a distillation vessel containing a fluid alcoholic mixture such that the pressure within the distillation vessel while distilling is from about 0.1 Torr to about 2 Torr;
   (b) distilling at least a portion of the fluid alcoholic mixture at a fluid alcoholic mixture temperature of from about −35° C. to about 0° C. to provide an alcoholic distillate; and
   (c) condensing the alcoholic distillate with a first condenser at a first condenser temperature of from about −196° C. to about −30° C. to provide a first alcoholic condensate.

In another embodiment, the first alcoholic condensate is packaged to provide an alcoholic beverage. In another embodiment, the alcoholic beverage comprises gin or is gin. In another embodiment, the alcoholic beverage comprises vodka or is vodka. In another embodiment, the alcoholic beverage comprises rum or is rum.

One embodiment of the present invention comprises a second condenser having a second condenser temperature which provides a second alcoholic condensate, wherein the alcoholic distillate contacts the first condenser before contacting the second condenser. In another embodiment, the first condenser temperature is from about −196° C. to about −25° C.

and the second condenser temperature is from about −196° C. to about −25° C. or from about −196° C. to about −30° C.

The present invention is also directed to a method for distilling an alcoholic mixture, comprising:
(a) reducing the pressure in a distillation vessel containing a fluid alcoholic mixture such that the pressure within the distillation vessel while distilling is from about 0.1 Torr to about 2 Torr;
(b) distilling at least a portion of the fluid alcoholic mixture at a fluid alcoholic mixture temperature of from about −35° C. to about 0° C. to provide an alcoholic distillate;
(c) condensing the alcoholic distillate with a first condenser at a first condenser temperature of from about −50° C. to about −30° C. to provide a first alcoholic condensate; and
(d) condensing the alcoholic distillate with a second condenser at a second condenser temperature of from about −196° C. to about −30° C. to provide a second alcoholic condensate.

In another embodiment, the first alcoholic condensate and the second alcoholic condensate are combined to form a combined alcoholic condensate and the combined alcoholic condensate is packaged to provide an alcoholic beverage. In another embodiment, the alcoholic beverage comprises gin or is gin. In another embodiment, the alcoholic beverage comprises vodka or is vodka. In another embodiment, the alcoholic beverage comprises rum or is rum.

Other embodiments of the present invention relate to an alcoholic condensate, a combined alcoholic condensate and/or an alcoholic beverage product made by any of the reduced pressure distillation methods described herein.

Alcoholic Mixture

As used herein, the phrase "alcoholic mixture" means a liquid composition comprising alcohol, i.e., ethyl alcohol or ethanol, and at least one other liquid, such as water, and, optionally, suspended solids. The liquid composition may be an admixture, such as a solution, a suspension, a dispersion, an emulsion, a microemulsion or the like.

Non-limiting examples of alcoholic mixtures useful in the reduced pressure distillation of the invention include, for example, any of the distilled spirits in Table 1 and/or any of the distilled spirits set forth in 27 C.F.R. §5.22, used singly or in any combination. Other non-limiting examples of alcoholic mixtures include mashes prepared from fermented grains (such as corn, wheat, barley or rye) and alcoholic beverages derived from fermented grains, e.g., gin, vodka, whiskey and/or beer. Other non-limiting examples of alcoholic mixtures include those derived from fermented fruits, e.g., wine, brandy, sherry and cognac; fermented juices derived from sugar cane and/or sugar beets, e.g., rum; or fermented juices, e.g., tequila. It will be understood that the alcoholic mixture can be in any stage of refinement, such as a fermented mash, or an alcoholic beverage.

TABLE 1

Categories of Distilled Spirits

| CLASS | EXEMPLARY TYPE(S) (If any) |
|---|---|
| Gin | Distilled Gin; Redistilled Gin; Compounded Gin |
| Neutral Spirits or Alcohol | Vodka; Grain Spirits |
| Rum | No type under this Class |
| Whiskey | Bourbon Whiskey; Rye Whiskey; Wheat Whiskey; Malt Whiskey; Rye Malt Whiskey; Corn Whiskey; Straight Bourbon Whiskey; Straight Rye Whiskey; Straight Wheat Whiskey; Straight Malt Whiskey; Straight Rye Malt Whiskey; Straight Corn Whiskey; Straight Whiskey; Whiskey Distilled From Bourbon Mash; Whiskey Distilled from Rye Mash; Whiskey Distilled from Wheat Mash; Whiskey Distilled from Malt Mash; Whiskey Distilled from Rye Malt Mash; Light Whiskey; Blended Light Whiskey or Light Whiskey - A Blend; Blended Whiskey or Whiskey - A Blend; Blended Bourbon Whiskey or Bourbon Whiskey - A Blend; Blended Rye Whiskey or Rye Whiskey - A Blend; Blended Wheat Whiskey or Wheat Whiskey - A Blend; Blended Malt Whiskey or Malt Whiskey - A Blend; Blended Rye Malt Whiskey or Rye Malt Whiskey - A Blend; Blended Corn Whiskey or Corn Whiskey - A Blend; A Blend of Straight Whiskies or Blended Straight Whiskies; Blend of Straight Bourbon Whiskies or Blended Straight Bourbon Whiskies; A Blend of Straight Rye Whiskies or Blended Straight Rye Whiskies; A Blend of Straight Wheat Whiskies or Blended Straight Wheat Whiskies; A Blend of Straight Rye Malt Whiskies or Blended Straight Rye Malt Whiskies; A Blend of Straight Corn Whiskies or Blended Straight Corn Whiskies; Spirit Whiskey; Scotch Whiskey; Blended Scotch Whiskey or Scotch Whiskey - A Blend; Irish Whiskey; Blended Irish Whiskey or Irish Whiskey - A Blend; Canadian Whiskey; Blended Canadian Whiskey or Canadian Whiskey - A Blend |
| Brandy | Fruit Brandy; Pisco; Applejack or Apple Brandy; Kirschwasser; Slivovitz; Immature Brandy; Cognac; Armagnac; Calvados; Dried Fruit Brandy; Raisin Brandy; Lees Brandy; Pomace Brandy or Marc Brandy; Grappa or Grappa Brandy; Residue Brandy; Neutral Brandy; Substandard Brandy |
| Blended Applejack or Applejack - a Blend | No type under this Class |
| Tequila | No type under this Class |
| Mescal/Mezcal | No type under this Class |
| Liqueur/Cordial | Sloe Gin; Rye Liqueur/Rye Cordial; Bourbon Liqueur/Bourbon |

TABLE 1-continued

Categories of Distilled Spirits

| CLASS | EXEMPLARY TYPE(S) (If any) |
|---|---|
| | Cordial; Rock and Rye; Rock and Bourbon; Rock and Brandy; Rock and Rum; Rum Liqueur/Rum Cordial; Gin Liqueur/Gin Cordial; Brandy Liqueur/Brandy Cordial; Arak/Arack/Rak; Amaretto; Kummel; Ouzo; Anise/Anisette; Sambuca; Peppermint Schnapps; Triple Sec; Curacao; Creme De Menthe; Goldwasser |
| Flavored Gin | No type under this Class |
| Flavored Vodka | No type under this Class |
| Flavored Rum | No type under this Class |
| Flavored Whiskey | No type under this Class |
| Flavored Brandy | No type under this Class |
| Imitation Distilled Spirits | Specific Class or Type to Which Distilled Spirits Would Otherwise Belong, e.g., "Imitation Rum" |
| Recognized Cocktails | Apricot Sour; Black Russian; Bloody Mary; __ Alexander (e.g., Brandy Alexander); Daiquiri; __ Daiquiri (e.g., Pineapple Daiquiri); Egg Nog; Gimlet; Vodka Gimlet; Grasshopper; Mai Tai; Manhattan; __ Manhattan (e.g., Scotch Manhattan); Margarita; __ Margarita (e.g., Strawberry Margarita); Martini; Vodka Martini; Mint Julep; __ Mint Julep (e.g., Vodka Mint Julep); Old Fashioned; Pink Squirrel; Screwdriver; Sloe Gin Fizz; Tom Collins; __ Collins (e.g., Vodka Collins); Wallbanger; Whiskey Sour; __ Sour (e.g., Pisco Sour); White Russian |
| Advocaat | No type under this Class |
| Aquavit | No type under this Class |
| Bitters | No type under this Class |
| Distilled Spirits Specialty | No type under this Class. Product definition is unique to composition and production of the distilled spirits product |

Gin

Gin designates an alcoholic mixture that derives its main characteristic flavor from juniper berries, is made by distillation from mash or by redistillation of distilled spirits or by mixing neutral spirits, with or over juniper berries and other aromatics, or with or over extracts derived from infusions, percolations, or maceration of such materials, and is bottled at not less than 80° proof. Gin may be made from any sugar or starch based vegetable, including sugarcane, grains and root vegetables such as potato and sugar beet, or from any spirit alcohol. The present invention is not limited to any particular type of gin as the starting alcoholic mixture. For example, there are two main types of gin known to the art and either is suitable. One main type is "dry gin," familiar as the American and English version of gin, which is a light, dry alcoholic beverage with a delicate flavoring of juniper and other aromatics. The other main type is "Dutch gin," which may also be known as "Hollands," "Genever" or "Schiedam." Dutch gins are very full flavored and full bodied with complex, malty aroma and taste. In contrast to "dry gin," because of its pronounced taste Dutch gin is usually consumed straight and not mixed with other ingredients in cocktails. Old Tom Gin is a gin that has been sweetened with syrup. Contrary to its name, Sloe Gin is not gin at all; it is a cordial deriving its flavor from the sloe berry. Table 1 provides information on exemplary types of gin contemplated for use as the alcoholic mixture of the present invention.

There are several methods of producing gin known in the art, including, for example, "distilled gin" (of which London gin and Plymouth gin are recognized as types) which is produced in the traditional method. Briefly, this method includes starting with a neutral spirit which has minimal or no color or flavor and is approximately 96% alcohol by volume. Botanicals are added and the mixture is heated to remove the essential oils from the botanicals. Pure water is then added as a proof-adjusting agent to bring the strength down to the desired level. In the case of a Dutch gin, the starting material is a grain mash distilled in a pot evaporation apparatus. It is then redistilled with juniper berries in another pot evaporation apparatus at low proof to produce its full bodied character.

Gin can also be produced by simply flavoring suitable alcohol with natural flavorants which give a predominant taste of juniper; this method is technically known in the art as "compounding." According to one embodiment of the present invention, the flavorant is present in the fluid alcoholic mixture during the distillation. Alternatively, in another embodiment of the present invention, the alcoholic distillate passes from the evaporation apparatus through a "gin head" charged with botanicals and becomes impregnated with the aromatic flavoring oils of the botanicals. In another embodiment of the present invention, the botanicals are put directly into the alcoholic mixture to be distilled.

In one embodiment of the present invention, the main flavorant for the gin comprises the juniper berry, juniper berry extract, or any combination thereof. When a flavorant is a natural material, it is often referred to as a "botanical." In another embodiment, the main flavorant for the gin consists essentially of the juniper berry. In another embodiment, the main flavorant for the gin is the juniper berry. In another embodiment, the main flavorant for the gin consists essentially of juniper berry extract. In another embodiment, the main flavorant for the gin is juniper berry extract.

In other embodiments of the present invention, other flavorants, e.g., herbs and spices, are also present in the gin, such as aloes, angelica, aniseed, arrowroot, chamomile, caraway, cardamom, cassia, centaury, cinnamon, citrus peels, cloves, coriander, fennel, gentian, ginger, hyssop, licorice, marjoram, mint, orris root, quinine, rosemary, sage, vanilla, angelica, orange peel, lemon peel, cinnamon, grains of paradise, cubeb berries and nutmeg, wormwood, or any combination thereof. The type and quantity of each producer's botanicals vary according to their own closely guarded recipes; all are carefully selected and tested for purity and quality.

In one embodiment, the invention relates to distillation of any kind of gin according to the reduced pressure distillation method of the present invention. In another embodiment, the gin alcoholic mixture is selected from distilled gin, redistilled gin, compounded gin, or any combination thereof. In another embodiment, the gin alcoholic mixture is selected from distilled gin, redistilled gin, or any combination thereof. In another embodiment, the gin alcoholic mixture is selected from distilled gin, compounded gin, or any combination thereof. In another embodiment, the gin alcoholic mixture is selected from compounded gin, redistilled gin, or any combination thereof. In another embodiment, the gin alcoholic mixture is distilled gin. In another embodiment, the gin alcoholic mixture is redistilled gin. In another embodiment, the gin alcoholic mixture is compounded gin.

In one embodiment, the invention relates to distillation of any class of gin according to the reduced pressure distillation method of the present invention. In another embodiment, the invention relates to distillation of any type of distilled gin, redistilled gin, compounded gin or flavored gin, singly or in any combination, according to the reduced pressure distillation method of the present invention.

In one embodiment, an infusion of gin botanicals and neutral spirits is pumped into a pot evaporation apparatus, the pressure is reduced, and ethanol and volatile components of the botanicals evaporate to form an alcoholic distillate and are separated from less volatile components of the alcoholic mixture. The alcoholic distillate is then condensed with a cold finger condensation member to form a first alcoholic condensate. In one embodiment, the cold finger is supplied with a refrigerant. In another embodiment, the cold finger is supplied with liquid nitrogen. In another embodiment, the cold finger is supplied with dry ice. The alcoholic condensate is then proof-adjusted with water to yield a reduced pressure distilled gin alcoholic beverage. In one embodiment, the reduced pressure distilled gin alcoholic beverage has an alcohol content of about 40% by volume (i.e., 40% ABV) or about 80° proof. In another embodiment, the reduced pressure distilled gin alcoholic beverage has an alcohol content of about 43.4% ABV or about 86.8° proof. In another embodiment, the reduced pressure distilled gin alcoholic beverage has an alcohol content of about 47% ABV or about 94° proof.

In one embodiment, the alcoholic condensate product of the method comprises a premium quality gin alcoholic beverage as exemplified by PINNACLE™ reduced-pressure distillation process gin.

Neutral Spirits

Neutral spirits designates an alcoholic mixture produced from any material at or above 190° proof and, if bottled, is bottled at not less than 80° proof. While distilled gin has flavor, a neutral spirit, such as vodka and grain spirits, is distilled to be tasteless. Vodka is a clear liquor manufactured from ethyl alcohol. It lacks color and, unless flavored, has very little taste or aroma. It is said to have been originally created in Russia from potatoes for medicinal purposes. Now, vodka is normally distilled from barley, wheat or rye. Like whiskey, vodka can be distilled from a fermented mash of grain. However, although whiskey is typically distilled at a low proof to retain its flavor, vodka is typically distilled at a high proof, 190° or above, and then processed even further to remove the flavor. Most distillers in the United States filter their vodkas through activated charcoal to remove the flavor. Vodka serves as the base ingredient for many cocktails, mixed drinks, and alcoholic products.

In one embodiment, the invention relates to distillation of any class of neutral spirit according to the reduced pressure distillation method of the present invention. In another embodiment, the invention relates to distillation of any type of vodka, grain spirit or flavored vodka, singly or in any combination, according to the reduced pressure distillation method of the present invention.

Rum

Rum designates an alcoholic mixture made from the fermented juice of sugar cane, sugar cane syrup, sugar cane molasses or other sugar cane by-products, is produced at less than 190° proof in such manner that the distilled alcoholic beverage possesses the taste, aroma and characteristics generally attributed to rum, and is bottled at not less than 80° proof. Rum is one of the oldest alcoholic beverages and is distilled from the extracted juice of the sugar cane plant or, in some cases, from the by-product of the refining process known as molasses. Unlike gin, almost all rum is aged in a charred wooden, e.g., oak, container up to and even beyond 30 years, although often for 15 years or less. Wood aging imparts a golden to dark brown color over time. Rum aged in steel tanks remains colorless. Rum products often differ greatly. Puerto Rican rum, for example, is a golden, light-bodied rum aged for at least 3 years, whereas Jamaican rum is a rich dark rum, naturally fermented for about 3 weeks, distilled twice in a pot evaporation apparatus, and aged in oak casks for at least 5 years.

In one embodiment, the invention relates to distillation of any class of rum according to the reduced pressure distillation method of the present invention. In another embodiment, the invention relates to distillation of any rum or flavored rum, singly or in any combination, according to the reduced pressure distillation method of the present invention.

Whiskey

Whisky designates an alcoholic mixture made from a fermented mash of grain produced at less than 190° proof in such manner that the alcoholic beverage possesses the taste, aroma, and characteristics generally attributed to whisky, is, except for corn whisky, stored in oak containers, and is bottled at not less than 80° proof.

In one embodiment, the alcoholic mixture is selected from bourbon whiskey; rye whiskey; wheat whiskey; malt whiskey; rye malt whiskey; corn whiskey; straight bourbon whiskey; straight rye whiskey; straight wheat whiskey; straight malt whiskey; straight rye malt whiskey; straight corn whiskey; straight whiskey; whiskey distilled from bourbon mash; whiskey distilled from rye mash; whiskey distilled from wheat mash; whiskey distilled from malt mash; whiskey distilled from rye malt mash; light whiskey; blended light whiskey or light whiskey—a blend; blended whiskey or whiskey—a blend; blended bourbon whiskey or bourbon whiskey—a blend; blended rye whiskey or rye whiskey—a blend; blended wheat whiskey or wheat whiskey—a blend; blended malt whiskey or malt whiskey—a blend; blended rye malt whiskey or rye malt whiskey—a blend; blended corn whiskey or corn whiskey—a blend; a blend of straight whiskies or blended straight whiskies; blend of straight bourbon whiskies or blended straight bourbon whiskies; a blend of straight rye whiskies or blended straight rye whiskies; a blend of straight wheat whiskies or blended straight wheat whiskies; a blend of straight rye malt whiskies or blended straight rye malt whiskies; a blend of straight corn whiskies or blended straight corn whiskies; spirit whiskey; Scotch whiskey; blended Scotch whiskey or Scotch whiskey—a blend; Irish whiskey; blended Irish whiskey or Irish whiskey—a blend; Canadian whiskey; blended Canadian whiskey or Canadian whiskey—a blend; or any combination thereof.

In another embodiment, the alcoholic mixture is selected from bourbon whiskey; rye whiskey; wheat whiskey; malt whiskey; rye malt whiskey; corn whiskey, or any combination thereof. In another embodiment, the alcoholic mixture is selected from bourbon whiskey; rye whiskey; wheat whiskey; or malt whiskey; or any combination thereof. In another embodiment, the alcoholic mixture is selected from bourbon whiskey, malt whiskey, or any combination thereof. In another embodiment, the alcoholic mixture is malt whiskey.

In one embodiment, the invention relates to distillation of any kind of whiskey according to the reduced pressure distillation method of the present invention.

Other Distilled Spirits

In one embodiment, the invention relates to distillation, using the reduced pressure distillation method of the present invention, of any kind of "conventional distilled spirit" as defined according to the distilled spirit definition provided in 27 U.S.C. §211(a), i.e., as gin, vodka, ethyl alcohol, hydrated oxide of ethyl, rum, whiskey, brandy, spirits of wine, and other distilled spirits, including all dilutions and mixtures thereof for nonindustrial use.

Other Additives

If desired, a proof-adjusting agent (e.g., water, ethanol) can be added to an alcoholic condensate to provide a first proof-adjusted alcoholic condensate. The proof adjusting agent can be added to increase or decrease the alcohol content of the alcoholic condensate. In one embodiment, the proof-adjusting agent is added to decrease the alcohol content of the alcoholic condensate. In another embodiment, the proof-adjusting agent is added to increase the alcohol content of the alcoholic condensate.

The amount of proof-adjusting agent added to the alcoholic condensate can vary. In one embodiment, the proof-adjusting agent is added in an amount sufficient to provide an alcohol content after adjustment of from about 40% to about 50% ABV, based on the total volume of the proof-adjusted alcoholic condensate. In another embodiment, the proof-adjusting agent is added in an amount sufficient to provide an alcohol content of about 47% ABV based on the total volume of the proof-adjusted alcoholic condensate. In another embodiment, the proof-adjusting agent is added in an amount sufficient to provide an alcohol content after adjustment of from about 43% to about 46% ABV, based on the total volume of the proof-adjusted alcoholic condensate. In another embodiment, the proof-adjusting agent is added in an amount sufficient to provide an alcohol content of from about 43% to about 45% ABV based on the total volume of the proof-adjusted alcoholic condensate. In another embodiment, the proof-adjusting agent is added in an amount sufficient to provide an alcohol content of about 44% ABV based on the total volume of the proof-adjusted alcoholic condensate. In another embodiment, the proof-adjusting agent is added in an amount sufficient to provide an alcohol content of about 43% ABV based on the total volume of the proof-adjusted alcoholic condensate. In another embodiment, the proof-adjusting agent is added in an amount sufficient to provide an alcohol content after adjustment of from about 40% to about 42% ABV, based on the total volume of the proof-adjusted alcoholic condensate. In another embodiment, the proof-adjusting agent is added in an amount sufficient to provide an alcohol content of about 40% ABV based on the total volume of the proof-adjusted alcoholic condensate.

Non-limiting examples of proof adjusting agents include flavorants, honey, water, including tap, distilled, demineralized, deionized and reverse-osmosis purified water, alcoholic mixtures, or any combination thereof. In one embodiment, the proof-adjusting agent is a flavorant. In another embodiment, the proof-adjusting agent is distilled water. In another embodiment, the proof-adjusting agent is demineralized water. In another embodiment, the proof-adjusting agent is deionized water. In another embodiment, the proof-adjusting agent is any mixture of demineralized and deionized water.

Flavorants for use with alcoholic mixtures contemplated by the present invention include, but are not limited to essential oils, oleoresins, spices, herbs, fruit juices/concentrates, commercially prepared flavors including essences, extracts, blenders, infusions. Non-limiting examples of flavorants include herbs and spices, such as aloes, angelica, aniseed, arrowroot, chamomile, caraway, cardamom, cassia, centaury, cinnamon, citrus peels, cloves, coriander, fennel, gentian, ginger, hyssop, licorice, marjoram, mint, orris root, quinine, rosemary, sage, vanilla, angelica, orange peel, lemon peel, cinnamon, grains of paradise, cubeb berries and nutmeg, wormwood, or any combination thereof.

In one embodiment, the alcoholic mixture comprises at least one flavorant, flavorant extract, colorant, colorant extract, blending material, blending material extract, essential oil, essential oil extract, or any combination thereof. In another embodiment, at least one flavorant is juniper berries or the at least one flavorant extract is juniper berry extract. In another embodiment, the alcoholic mixture comprises gin or is gin. In another embodiment, the alcoholic mixture comprises vodka or is vodka. In another embodiment, water is added to the first alcoholic condensate and the first alcoholic condensate is packaged to provide an alcoholic beverage. In another embodiment, a fraction of the first alcoholic condensate is separated, water is added thereto, and packaged to provide an alcoholic beverage. In another embodiment, a fraction of the first alcoholic condensate is recycled or discarded and water is added to the remaining fraction of the first alcoholic condensate, to provide an alcoholic beverage.

Colorants and colorant extracts for use with alcoholic mixtures contemplated by the present invention include, but are not limited to, annato extract, anthocyanins, aronia/redfruit, beet juice colors, beta carotene, beta apo 8 carotenal, black currant, burnt sugar, canthaxanthin, caramel, carbo medicinalis, carmine, carmine/beta carotene, carmine blue, carminic acid, carrot, chlorophyll, chlorophyllin, cochineal extract, copper-chlorophyll, copper-chlorophyllin, curcumin, curcumin/cu-chloro, elderberry, grape, hibiscus, lutein, mixed carotenoids, paprika, paprika extract, paprika oleoresin, riboflavin, spinach, stinging nettle, titanium dioxide, tumeric and the like.

Blending materials and blending material extracts for use with alcoholic mixtures contemplated by the present invention include, but are not limited to, water, such as tap water, distilled water, deionized water and reverse-osmosis purified water, distilled spirits, neutral spirits, grain spirits, any fruit juice, and the like.

Essential oils and essential oil extracts for use with alcoholic mixtures contemplated by the present invention include, but are not limited to, orange oil, lemon oil, lime oil, lavender oil, coriander oil, juniper oil, orange oil extract, lemon oil extract, lime oil extract, lavender oil extract, coriander oil extract, juniper oil extract, and the like.

Alcoholic Beverage and Blended Alcoholic Beverage

In one embodiment, the present invention relates to an alcoholic beverage prepared by any method of the invention. In another embodiment, the present invention relates to an alcoholic beverage comprising an alcoholic condensate of the invention, for example, gin made by the reduced pressure distillation method of the invention. In another embodiment of the present invention, the first alcoholic condensate is packaged to provide an alcoholic beverage. In another embodiment of the present invention, the second alcoholic condensate is packaged to provide an alcoholic beverage. In another embodiment, the first alcoholic condensate and the second alcoholic condensate are combined to form a combined alcoholic condensate. In another embodiment, the combined alcoholic condensate is packaged to provide an alcoholic beverage.

In one embodiment, the present invention relates to a blended alcoholic beverage comprising a blend of an alcoholic condensate of the invention and at least one conventional distilled spirit, i.e., a spirit distilled under prior art conditions and not according to the reduced pressure method of the present invention. In the context of a "blended alcoholic beverage," the term "conventional distilled spirit" is defined according to the distilled spirit definition provided in 27 U.S.C. §211(a), i.e., as gin, vodka, ethyl alcohol, hydrated oxide of ethyl, rum, whiskey, brandy, spirits of wine, and other distilled spirits, including all dilutions and mixtures thereof for nonindustrial use.

In another embodiment, the blended alcoholic beverage contains more of the alcoholic condensate of the invention by volume than all of the volume of the conventional distilled spirit(s) present in the blended alcoholic beverage. In another embodiment, the blended alcoholic beverage contains at least about 51% by volume of an alcoholic condensate of the invention and up to about 49% by volume of all of the conventional distilled spirit(s) present in the blended alcoholic beverage. In another embodiment, the blended alcoholic beverage is formed from up to about 95% by volume of an alcoholic condensate of the invention. In another embodiment, the blended alcoholic beverage is formed from at least about 5% by volume of an alcoholic condensate of the invention. In another embodiment, the blended alcoholic beverage is formed from at least about 5% by volume of an alcoholic condensate of the invention and up to about 95% by volume of all of the conventional distilled spirit(s) present in the blended alcoholic beverage. In another embodiment, the blended alcoholic beverage is formed from at least about 5% by volume of all of the conventional distilled spirit(s) present in the blended alcoholic beverage and up to about 95% by volume of an alcoholic condensate of the invention.

In another embodiment, the blended alcoholic beverage is formed from up to about 90% by volume of all of the conventional distilled spirit(s) present in the blended alcoholic beverage. In another embodiment, the blended alcoholic beverage is formed from at least about 10% by volume of an alcoholic condensate of the invention. In another embodiment, the blended alcoholic beverage is formed from at least about 10% by volume of an alcoholic condensate of the invention and up to about 90% by volume of all of the conventional distilled spirit(s) present in the blended alcoholic beverage. In another embodiment, the blended alcoholic beverage is formed from up to about 90% by volume of an alcoholic condensate of the invention. In another embodiment, the blended alcoholic beverage is formed from at least about 10% by volume of all of the conventional distilled spirit(s) present in the blended alcoholic beverage and up to about 90% by volume of an alcoholic condensate of the invention.

In one embodiment, the present invention relates to a blended alcoholic beverage comprising a blend of an alcoholic condensate of the invention and at least one conventional wine. In the context of a "blended alcoholic beverage," the term "conventional wine" is defined according to the wine definition provided in 27 U.S.C. §211(a), i.e., as (a) wine as defined in §610 and §617 of the Revenue Act of 1918 (26 U.S.C. §§5381-5392), as now in force or hereafter amended, and (b) other alcoholic beverages not so defined, but made in the manner of wine, including sparkling and carbonated wine, wine made from condensed grape must, wine made from other agricultural products than the juice of sound, ripe grapes, imitation wine, compounds sold as wine, vermouth, cider, sherry, and sake; in each instance, only if containing not less than 7% and not more than 24% ABV, and if for nonindustrial use.

In another embodiment, the blended alcoholic beverage contains more of an alcoholic condensate of the invention by volume than all of the volume of the conventional wine(s) present in the blended alcoholic beverage. In another embodiment, the blended alcoholic beverage contains at least about 51% by volume of an alcoholic condensate of the invention and up to about 49% by volume of all of the conventional wine(s) present in the blended alcoholic beverage. In another embodiment, the blended alcoholic beverage is formed from up to about 95% by volume of an alcoholic condensate of the invention. In another embodiment, the blended alcoholic beverage is formed from at least about 5% by volume of an alcoholic condensate of the invention. In another embodiment, the blended alcoholic beverage is formed from at least about 5% by volume of an alcoholic condensate of the invention and up to about 95% by volume of all of the conventional wine(s) present in the blended alcoholic beverage. In another embodiment, the blended alcoholic beverage is formed from at least about 5% by volume of all of the conventional wine(s) present in the blended alcoholic beverage and up to about 95% by volume of an alcoholic condensate of the invention.

In another embodiment, the blended alcoholic beverage is formed from up to about 90% by volume of all of the conventional wine(s) present in the blended alcoholic beverage. In another embodiment, the blended alcoholic beverage is formed from at least about 10% by volume of an alcoholic condensate of the invention. In another embodiment, the blended alcoholic beverage is formed from at least about 10% by volume of an alcoholic condensate of the invention and up to about 90% by volume of all of the conventional wine(s) present in the blended alcoholic beverage. In another embodiment, the blended alcoholic beverage is formed from up to about 90% by volume of an alcoholic condensate of the invention. In another embodiment, the blended alcoholic beverage is formed from at least about 10% by volume of all of the conventional wine(s) present in the blended alcoholic beverage and up to about 90% by volume of an alcoholic condensate of the invention.

In another embodiment, an alcoholic condensate of the invention in the blended alcoholic beverage comprises flavored gin or at least one member of the gin class. In another embodiment, an alcoholic condensate of the invention in the blended alcoholic beverage consists essentially of flavored gin, at least one member of the gin class or any combination thereof. In another embodiment, an alcoholic condensate of the invention in the blended alcoholic beverage is flavored gin, at least one member of the gin class or any combination thereof. In each of these embodiments, the conventional distilled spirit in the blended alcoholic beverage comprises a conventional gin product in one embodiment, consists essentially of a conventional gin product in another embodiment, and is a conventional gin product in another embodiment. As is known in the art, conventional gin products are produced in a pot still or in a continuous still by an ambient-pressure distillation at a temperature of about 80° C. or at a distillation temperature of about 50-60° C. and under mild vacuum, from about 175 Torr to about 325 Torr. In another embodiment, an alcoholic condensate of the invention in the blended alcoholic beverage comprises flavored vodka or at least one member of the neutral spirit class. In another embodiment, an alcoholic condensate of the invention in the blended alcoholic beverage consists essentially of flavored vodka, at least one member of the neutral spirit class or any combination thereof. In another embodiment, an alcoholic condensate of the invention in the blended alcoholic beverage is flavored vodka, at least one member of the neutral spirit class or any combination thereof. In each of these embodiments, the conventional distilled spirit in the blended alcoholic beverage comprises a conventional neutral spirit product in one embodiment, consists essentially of a conventional neutral spirit product in another embodiment, and is a conventional neutral spirit product in another embodiment. As is known in the art, conventional neutral spirit products are produced by an ambient-pressure distillation at a temperature at or above about 88° C.

In another embodiment, an alcoholic condensate of the invention in the blended alcoholic beverage comprises rum or flavored rum. In another embodiment, an alcoholic condensate of the invention in the blended alcoholic beverage consists essentially of rum, flavored rum or any combination thereof. In another embodiment, an alcoholic condensate of the invention in the blended alcoholic beverage is rum, flavored rum or any combination thereof. In each of these embodiments, the conventional distilled spirit in the blended alcoholic beverage comprises a conventional rum product in one embodiment, consists essentially of a conventional rum product in another embodiment, and is a conventional rum product in another embodiment. As is known in the art, conventional rum products are produced in a pot still or in a two- or three-column distillation unit by an ambient-pressure distillation using steam, either to heat the pot still or injected into the bottom of an analyzing or stripping column, e.g., as described at http://www.knet.co.za/psrum/manufacturing_rum.htm. Therefore, as is known in the art, conventional rum products are produced at a distillation temperature of well above about 50° C.

The blending can be carried out by any method known in the art. In one embodiment, the blend is formed by an admixing method, non-limiting examples of which include stirring, rotating, shaking, pumping, or any combination thereof. In one embodiment, the admixing method is pumping.

The present invention is not to be limited in scope by the specific embodiments disclosed in the examples which are intended as illustrations of a few aspects of the invention and any embodiments that are functionally equivalent are within the scope of this invention. Indeed, various modifications of the invention in addition to those shown and described herein will become apparent to those skilled in the art and are intended to fall within the scope of the appended claims.

A number of references have been cited, the entire disclosures of which are incorporated herein by reference.

6. EXAMPLES

The following examples are set forth to assist in understanding the invention and should not be construed as specifically limiting the invention described and claimed herein. Such variations of the invention, including the substitution of all equivalents now known or later developed, which would be within the purview of those skilled in the art, and changes in formulation or minor changes in experimental design, are to be considered to fall within the scope of the present invention incorporated herein.

Example 6.1

Reduced Pressure Batch Distillation Using a Single Condenser for Gin

A fluid alcoholic mixture, AM1, was prepared by admixing grain neutral spirits of 95% ABV with a proprietary blend of about 10 to 20 botanicals, one of which was juniper berries, and diluted to 85% ABV with demineralized water. 5 L (about 1.3 gallons) at about 25° C. of AM1 was introduced into a substantially vertical stainless steel and glass evaporation apparatus of about 20 L capacity (Myers Vacuum, Kittanning, Pa.), e.g., 11 (See FIG. 1). The evaporation apparatus further comprised a liquid gauge for ascertaining the level of AM1 in the evaporation apparatus.

To begin the distillation, a vacuum pump (Leybold TRIVAC from Leybold Vacuum GmbH) was used to reduce the pressure inside the evaporation apparatus containing the AM1. As the pressure was reduced, the AM1 inside the evaporation apparatus began to vaporize to an alcoholic distillate and the temperature of the remaining fluid AM1 began to fall. The bottom and sides of the evaporation apparatus were wrapped with external heating mantles (GLAS-COL, Terre Haute, Ind.). Sufficient electrical power was supplied to the heating mantles as required so that the alcoholic mixture was kept above its freezing temperature throughout the distillation. However, as discussed and illustrated in more detail below, at no time was the amount of external heating provided such that the temperature of the alcoholic mixture being distilled exceeded about 0° C.

A conduit, e.g., 16, directed the alcoholic distillate from the evaporation apparatus to a condensation apparatus, located in close proximity to and in fluid communication with the evaporation apparatus, comprising a single glass condenser, e.g., 21. A steel cold finger condensation member, with a surface area of about 950 cm$^2$ and cooled by liquid nitrogen to a temperature of about −196° C., condensed the alcoholic distillate to an alcoholic condensate, i.e., gin. A tube, e.g., 27, connected to a product pump, e.g., 28, was used to remove the gin from the condensation apparatus.

Figure 3A:
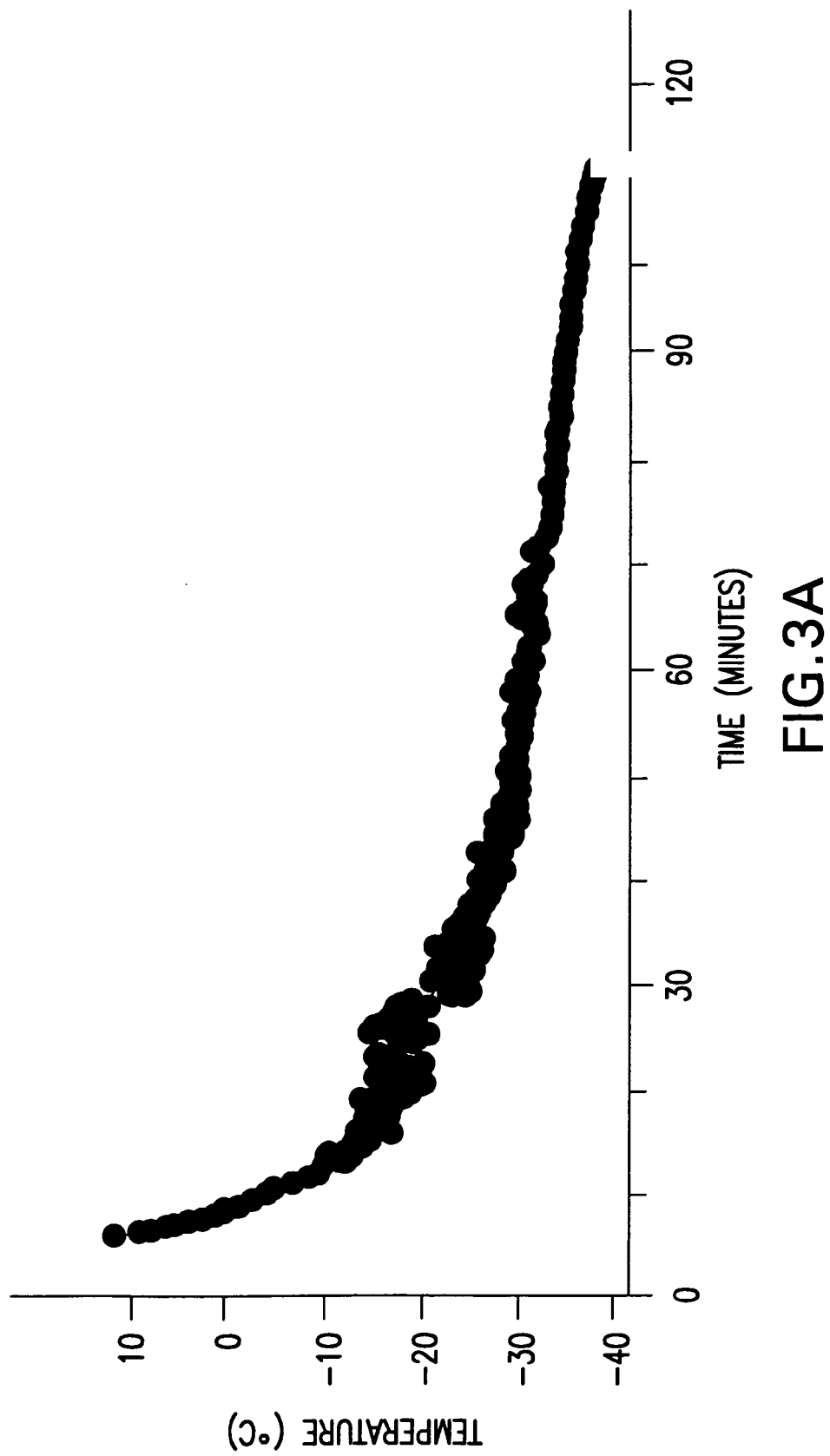
FIG. 3 depicts an example chart of concurrent recordings of temperature (FIG. 3A) and pressure (FIG. 3B) from a reduced pressure evaporation apparatus used according to the method of the present invention.
Figure 3B:
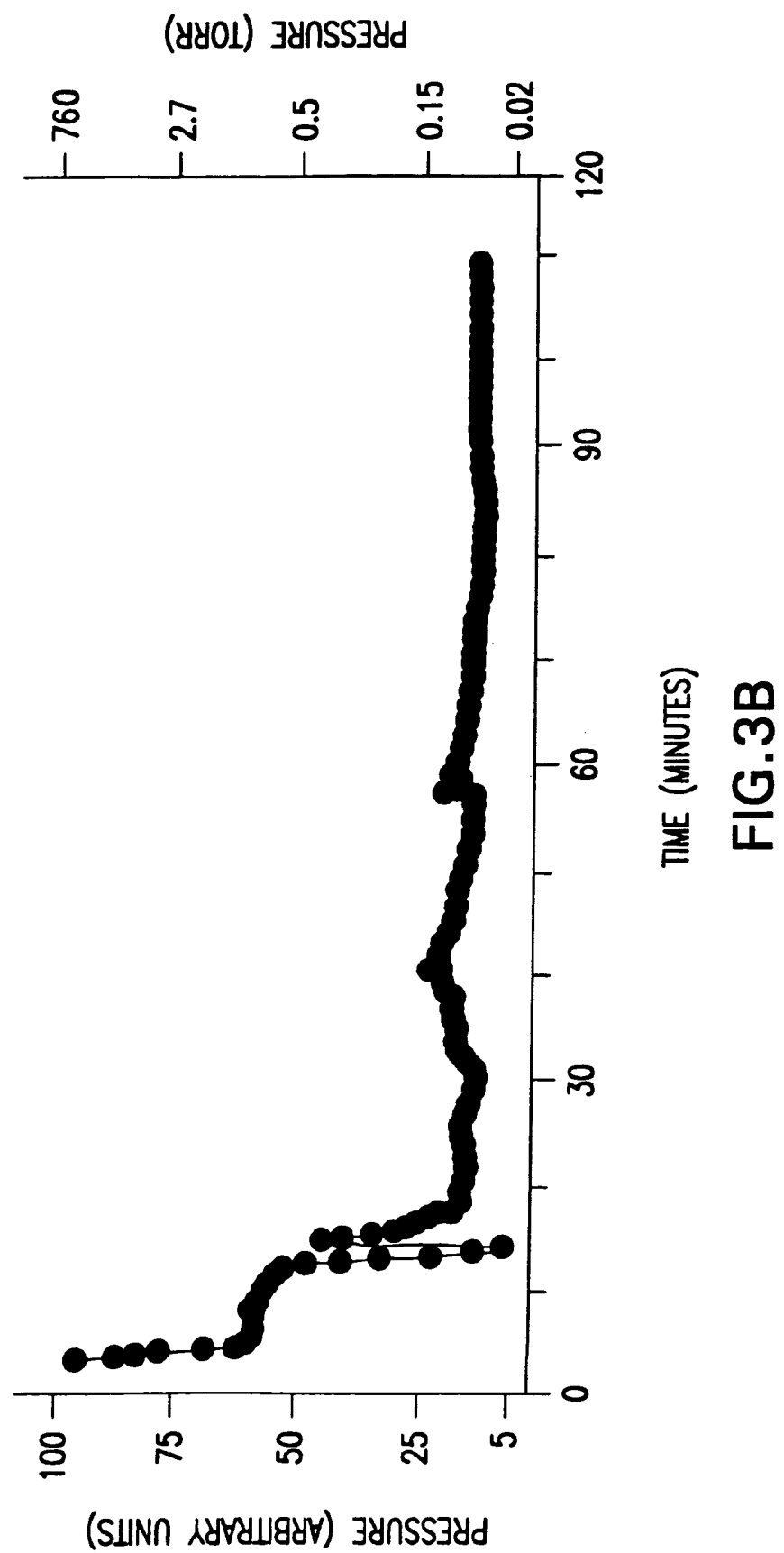

Some of the temperature and pressure readings obtained during the distillation of AM1 under reduced pressure in this example are shown in FIG. 3.

After 120 minutes, the distillation was halted by returning the pressure inside of the evaporation apparatus to atmospheric. 4.2 L (1.1 gallons) of premium gin product of about 160° proof were obtained (about 84% yield). The gin product was proof adjusted to a proof of 94° by the addition of demineralized water and then packaged to provide a premium gin alcoholic beverage.

Example 6.2

Reduced Pressure Batch Distillation of Using a Single Condenser for Gin

The procedure described in Example 1 was used to produce a batch of gin from AM1 under reduced pressure except that the cold finger condensation member was cooled by dry ice/ethanol to a temperature ranging from about −71° C. to about −31° C. during the distillation. As the dry ice sublimed and the temperature of the cold finger began to rise, additional dry ice was added to reduce the cold finger temperature. The gin product was proof adjusted to a proof of 94° by the addition of demineralized water and then packaged to provide a premium gin alcoholic beverage.

Example 6.3

Reduced Pressure Distillation Using Dual Condensers for Gin

5 L (about 1.3 gallons) at about 25° C. of the AM1 alcoholic mixture described in Example 1 is introduced into a substantially vertical evaporation apparatus similar to the one described in Example 1, e.g., 32 (See FIG. 2). The evaporation apparatus further comprises a feed pump for supplying AM1 to the evaporation apparatus and a liquid gauge for ascertaining the level of AM1 in the evaporation apparatus, each similar to the ones described in the previous example.

To begin the distillation, a vacuum pump reduces the pressure inside the evaporation apparatus containing AM1. As the pressure reduces, the AM1 inside the evaporation apparatus begins to vaporize to an alcoholic distillate and the temperature of the remaining liquid AM1 begins to fall. The bottom and sides of the evaporation apparatus are wrapped with external heating mantles (GLAS-COL, Terre Haute, Ind.). Sufficient electrical power is supplied to the heating mantles such that the AM1 is kept above its freezing temperature throughout the distillation.

A conduit directs the alcoholic distillate from the evaporation apparatus to a condensation apparatus, located in close proximity to and in fluid communication with the evaporation apparatus, comprising dual condensers, e.g., 41. Dry ice/ethanol cools the temperature of the cold finger condensation member in the first condenser to a temperature ranging from about −71° C. to about −31° C. during the distillation. As the dry ice sublimes and the temperature of the cold finger begins to rise, additional dry ice is added to reduce the cold finger temperature. A fraction of the alcoholic distillate condenses in the first condenser to form a first alcoholic condensate.

The remaining alcoholic distillate passes into contact with the second condenser, which is located in close proximity to and in fluid communication with the first condenser. A cold finger condensation member present in the second condenser, cooled by liquid nitrogen to a temperature of about −196° C., condenses additional alcoholic distillate to a second alcoholic condensate. Tubing, e.g., 46, connecting to a product pump, e.g., 49, removes the combined alcoholic condensate from the condensation apparatus.

Once the vacuum pumping is initiated, the pressure reduction system maintains a negative pressure differential (relative to atmospheric) on the evaporation apparatus and condensation apparatus. The temperature and pressure settings during the distillation of AM1 under reduced pressure are similar to those provided in FIG. 3.

After 120 minutes without interruption or down time, the distillation is halted by returning the pressure inside of the evaporation apparatus to atmospheric. 4.3 L of premium gin product of about 160° proof are obtained (about 86% yield). The gin product is proof adjusted to a proof of about 94° by the addition of demineralized water and, thereafter, is packaged to provide a premium gin alcoholic beverage.

Example 6.4

Reduced Pressure Distillation Using a Single Condenser for Vodka

5 L (about 1.3 gallons) at about 25° C. of an alcoholic mixture consisting essentially of 85% ABV neutral spirits, i.e., lacking the proprietary blend of botanicals described in Example 1, was introduced into the evaporation apparatus described in Example 1. The alcoholic mixture was distilled under reduced pressure to provide a vodka alcoholic condensate of about 192° proof in about 90% yield according to the procedure described in Example 1. The vodka product was proof adjusted to a proof of 80° by the addition of demineralized water and then packaged to provide a premium vodka alcoholic beverage.

Example 6.5

Reduced Pressure Distillation of Rum Using a Single Condenser

5 L (about 1.3 gallons) at about 25° C. of an alcoholic mixture consisting essentially of rum, i.e., aged BACARDI rum of about 130° proof, was introduced into the evaporation apparatus described in Example 1. The rum was distilled under reduced pressure to provide a rum alcoholic condensate comprising about 86% ABV according to the procedure described in Example 1. The rum product was proof adjusted to a proof of about 80° by the addition of demineralized water and, thereafter, packaged to provide a premium rum alcoholic beverage.

Example 6.6

Reduced Pressure Distillation of Rum Using Dual Condensers

5 L (about 1.3 gallons) at about 25° C. of an alcoholic mixture consisting essentially of the rum described in Example 5 is introduced into the evaporation apparatus described in Example 3. The rum is distilled under reduced pressure to provide a combined alcoholic condensate according to the procedure described in Example 3. This rum product is proof adjusted to a proof of about 80° by the addition of demineralized water and, thereafter, is packaged to provide a premium rum alcoholic beverage.

Example 6.7

Chemical Analysis of Gin of the Invention

Figure 4B:
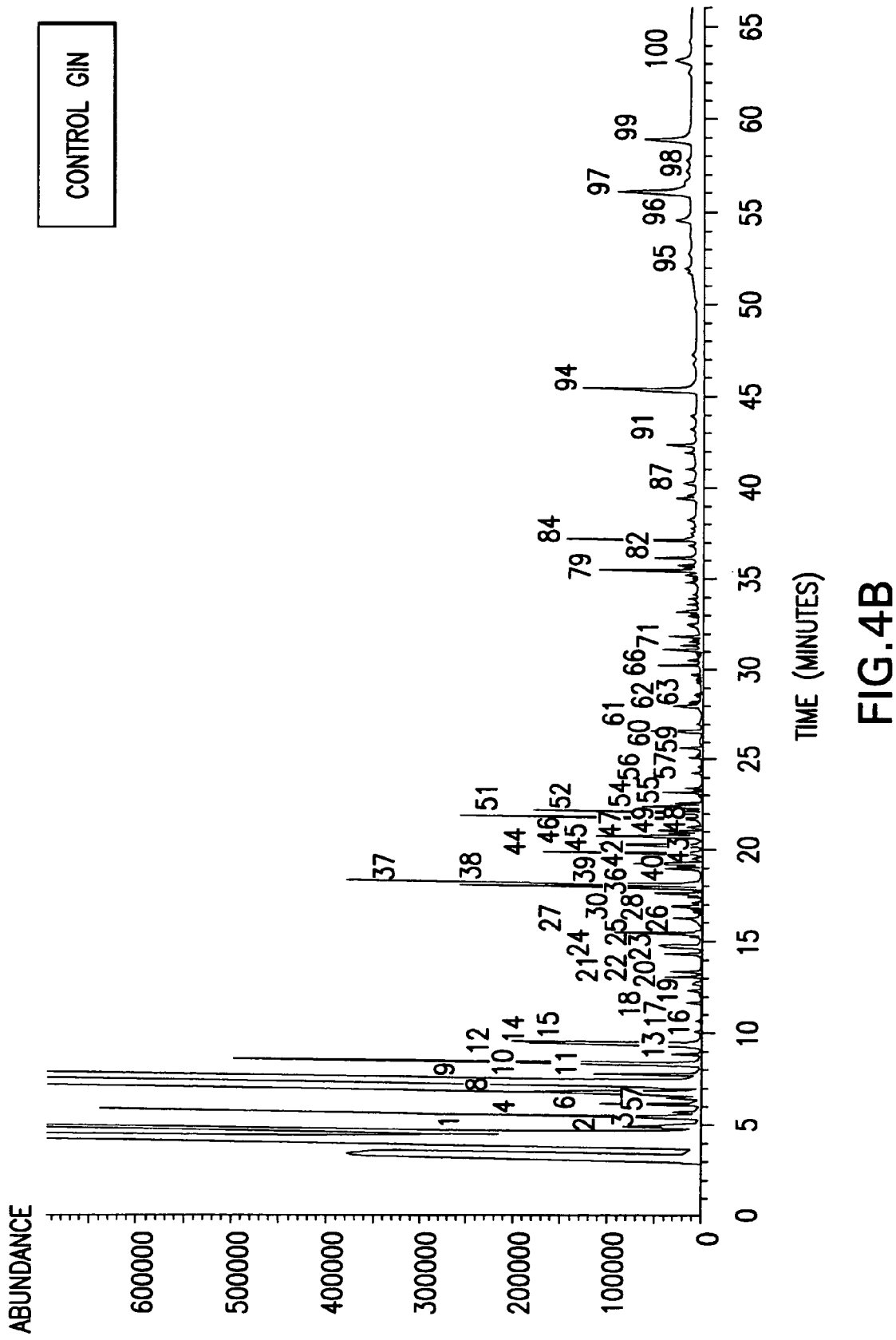
FIG. 4 shows GC/MS data for a gin distilled under the reduced pressure method of the invention (Example 1 Gin, FIG. 4A) and a conventional gin (Control Gin, FIG. 4B).

A chemical constituent analysis comparison was made between gin distilled under the reduced pressure method of the invention as described in Example 1 (labeled "Example 1 Gin" in FIG. 4A), compared with a control of conventional gin, also made from the AM1 alcoholic mixture but distilled under conventional heating conditions at atmospheric pressure, i.e., at a temperature ranging from about 70° C. to about 90° C. at 1 atm, then adjusted to 94° proof by the addition of demineralized water (labeled "Control Gin" in FIG. 4B).

Each of these two gins was subjected to gas chromatography/mass spectroscopy ("GC/MS") analysis conducted under substantially the same conditions in order to analyze the chemical components of each of the gins and their abundance, thereby providing a "fingerprint" of each gin up to an analysis time of about 90 minutes. at $C_{11}$ esters were added to each sample to provide an internal reference standard. A HP 6890 GC gas chromatograph (Agilent Technologies, Palo Alto, Calif.) with mass spectrometer detection (positive ion) was used. The GC column was a 50 meter QUADREX FFAP column of 250 μm internal diameter. A film of 0.25 μm thickness was used. Helium was used as the carrier gas.

As is evident from their fingerprints in FIG. 4, the Example 1 Gin, distilled under reduced pressure, was, e.g., freer of certain components than the Control Gin distilled under conventional heating conditions. Table 2 below provides an assignment of chemical constituents to certain numbered GC/MS peaks in the fingerprints. For clarity, the peak numbering is indicated only for the Control Gin fingerprint (FIG. 4B); the same number, of course, applies to a peak at the same time position of the Example 1 Gin fingerprint (FIG. 4A).

TABLE 2

GC/MS Peak Assignments

| Peak # | Chemical Constituent(s) |
|---|---|
| 1. | α-Pinene |
| 2. | Camphene |
| 3. | 1-Decene |
| 4. | β-Pinene |
| 5. | 4-Methyl-1-(1-methylethyl)bicyclo[3.1.0]hex-2-ene |
| 6. | 3-Carene |
| 7. | α-Phellandrene |
| 8. | β-Pinene; 4-Carene |
| 9. | Limonene |
| 10. | β-Phellandrene |
| 11. | Eucalyptol |
| 12. | 3-Carene |
| 13. | 3,7-Dimethyl-1,3,7-octatriene |
| 14. | 1-Methyl-4-(1-methylethyl)benzene |
| 15. | 1-Methyl-4-(1-methylethylidene)cyclohexene |
| 16. | Hexyl acetate |
| 17. | Unknown |
| 18. | Unknown |
| 19. | Hexyl-2-methyl-propanoate |
| 20. | 2,6-Dimethyl-2,4,6-octatriene |
| 21. | Unknown |
| 22. | Octen-1-ol acetate |
| 23. | Hexyl butanoate |
| 24. | 1-Methyl-4-(1-methylethenyl)benzene |
| 25. | α-Cubebene |
| 26. | Hexyl isovalerate |
| 27. | Copaene |
| 28. | Octahydro naphthalenes |
| 29. | possibly Octyl acetate |
| 30. | Furfural |
| 31. | 1,7,7-Trimethylbicyclo[2.2.1]heptan-2-one |
| 32. | possibly Cedrene |
| 33. | Epizonarene |
| 34. | Decahydro methanoazulenes |
| 35. | possibly Hexahydro naphthalenes |
| 36. | 1,7-Dimethyl-7-(4-methyl-3-pentyl)tricyclo[2.2.1.0](2,6)heptane |
| 37. | Linalyl butyrate |
| 38. | Caryophyllene |
| 39. | 1-Ethenyl-1-methyl-2,4-bis(1-methylethyl)cyclohexane |
| 40. | 4-Methyl-1-(1-methylethyl)-3-cyclohexen-1-ol |
| 41. | possibly 3,7-Dimethyl-2,6-octadien-1-ol |
| 42. | γ-Elemene |
| 43. | Epi-bicyclosesquiphellandrene |
| 44. | Tetramethylcycloundecatriene |
| 45. | Octahydro napthalenes |
| 46. | δ-Germacrene |
| 47. | Octahydro naphthalenes |
| 48. | Octahydro naphthalenes |
| 49. | Hexahydro naphthalenes |
| 50. | α-Terpineol |
| 51. | Hexahydro naphthalenes |
| 52. | $C_{11}$ esters (added Internal Standard) |
| 53. | Hexahydro naphthalenes |
| 54. | 3,7-Dimethyl-2,6-octadien-1-ol acetate |
| 55. | 4,7-Dimethyl-1-6-octadien-3-ol isovalerate |
| 56. | β-Germacrene |
| 57. | Tetrahydro naphthalenes |
| 58. | possibly Epizonarene |
| 59. | possibly 1,2-Dihydro-1,1,6-trimethylnaphthalene |
| 60. | Unknown |
| 61. | Caryophyllene oxide |
| 62. | Unknown |
| 63. | possibly a Naphthalene |
| 64. | Unknown |
| 65. | 6,10,14-Trimethyl-2-pentadecanone |
| 66. | 2-iso-Propyl-5-methyl-9-methylene-bicyclo[4.4.0]dec-1-ene |
| 67. | possibly α-Cardinol |
| 68. | α-Bisabolol |
| 69. | possibly α-Cardinol |
| 70. | Oxacyclohexadecan-2-one |
| 71. | $C_{16}$ esters |
| 72. | $C_{10}$ hydrocarbons+; unknown |
| 73. | Unknown |
| 74. | Isoaromadendrene epoxide; oxacycloheptadecan-2-one |
| 75. | Unknown |

TABLE 2-continued

GC/MS Peak Assignments

| Peak # | Chemical Constituent(s) |
|---|---|
| 76. | Cyclotetradecane |
| 77. | 1,1-Dimethylethyl hexadecanoate |
| 78. | $C_{18}$ esters |
| 79. | Ethyl oleate |
| 80. | possibly Benzoic acid |
| 81. | $C_{12}$ hydrocarbons+ |
| 82. | Ethyl linoleate |
| 83. | Unknown |
| 84. | 5-Hydro-4-methyl-furfural |
| 85. | Unknown |
| 86. | Butyl octadecanoate |
| 87. | $C_{14}$ hydrocarbons+ |
| 88. | Unknown |
| 89. | Unknown |
| 90. | Unknown |
| 91. | Unknown |
| 92. | Octacosane |
| 93. | Unknown |
| 94. | $C_{16}$ hydrocarbons+ |
| 95. | Docosane |
| 96. | possibly $C_{18}$ hydrocarbons+ |
| 97. | 9-Octadecenoic acid |
| 98. | Di-n-octyl phthalate |
| 99. | 9,12-Octadecadienoic acid |
| 100. | Methyl-9,12,15-octadecatrienoate |

Figure 5A:
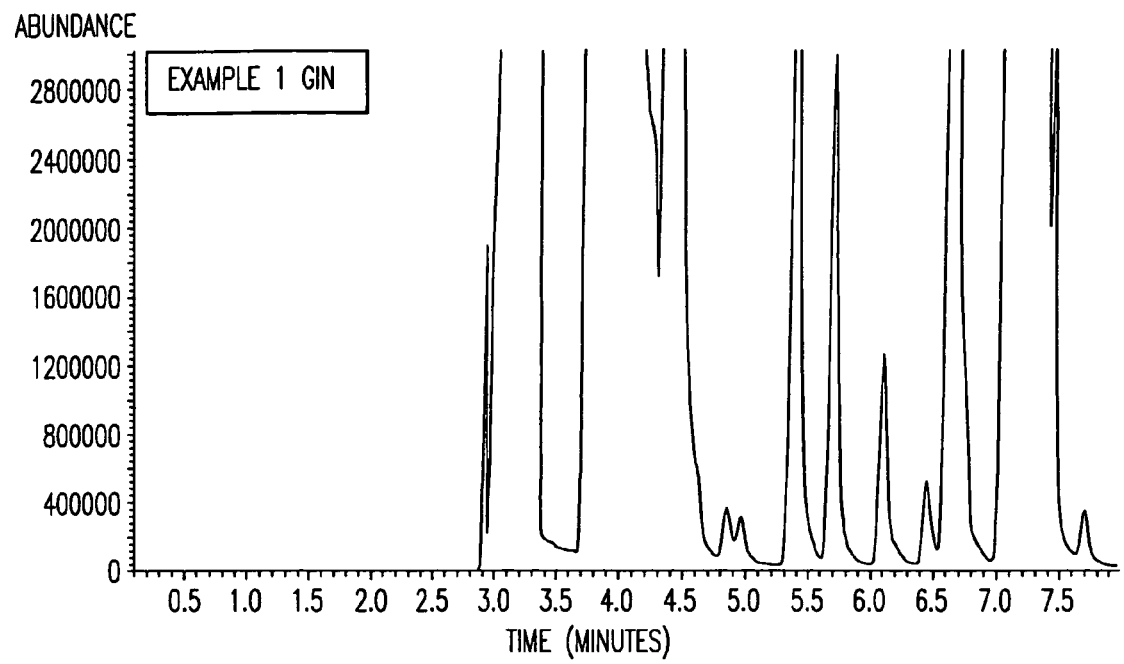
FIG. 5 shows an expanded portion of the abscissa of the FIG. 4 GC/MS data for a gin distilled under the reduced pressure method of the invention (Example 1 Gin, FIG. 5A) and a conventional gin (Control Gin, FIG. 5B).
Figure 5B:
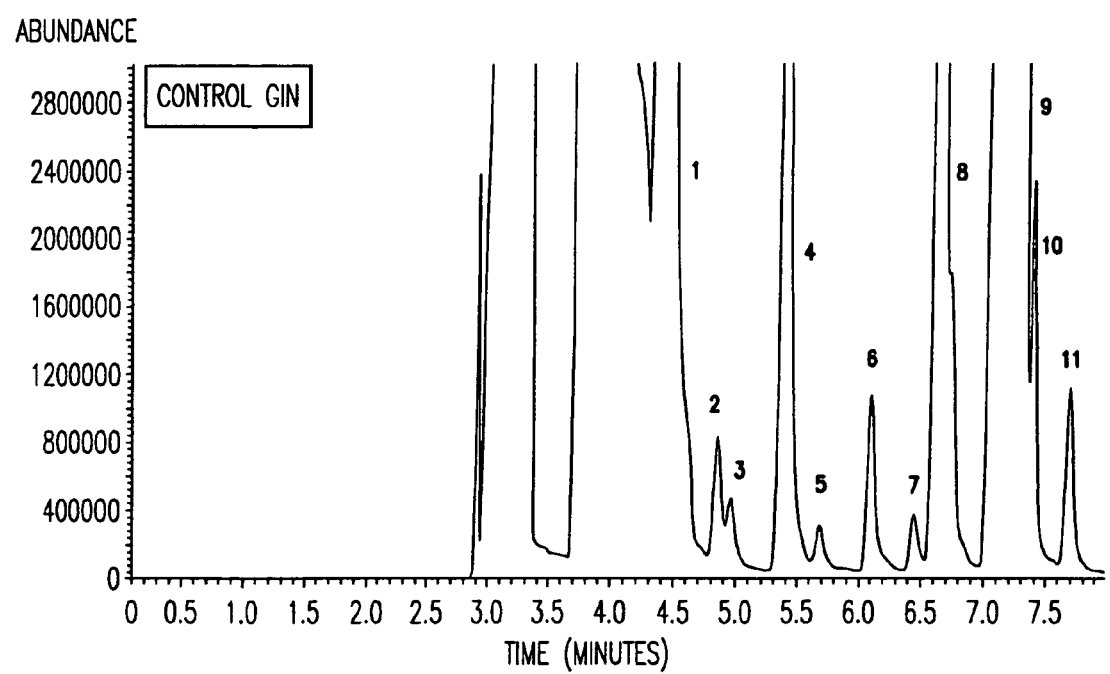
Figure 6A:
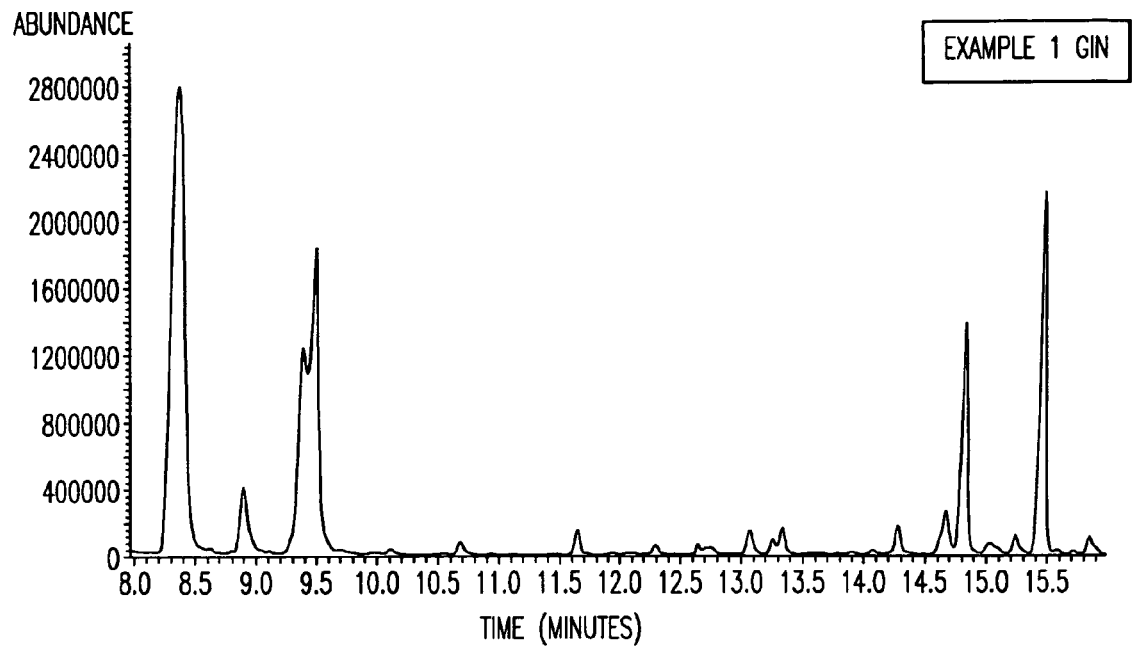
FIG. 6 shows an expanded portion of the abscissa of the FIG. 4 GC/MS data for a gin distilled under the reduced pressure method of the invention (Example 1 Gin, FIG. 6A) and a conventional gin (Control Gin, FIG. 6B).
Figure 6B:
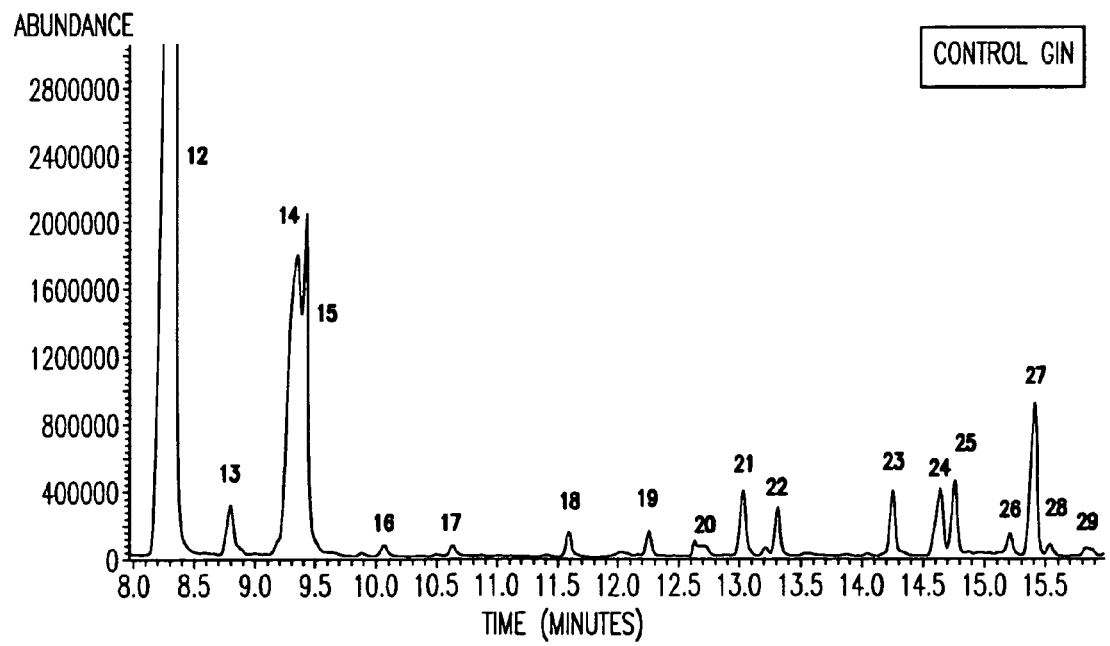
Figure 7A:
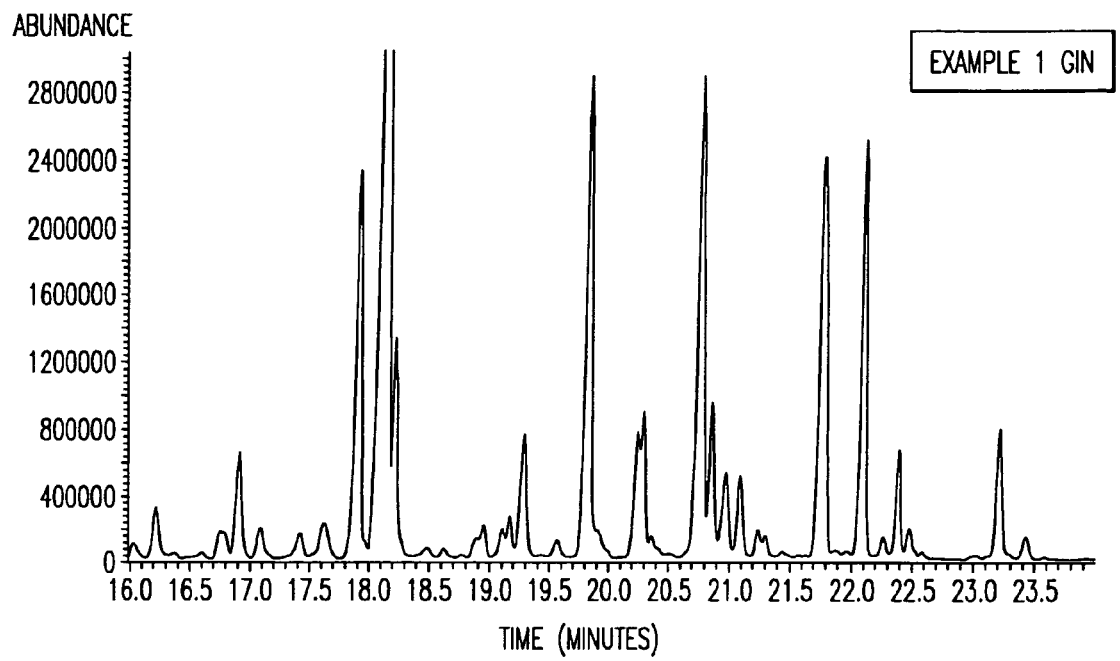
FIG. 7 shows an expanded portion of the abscissa of the FIG. 4 GC/MS data for a gin distilled under the reduced pressure method of the invention (Example 1 Gin, FIG. 7A) and a conventional gin (Control Gin, FIG. 7B).
Figure 7B:
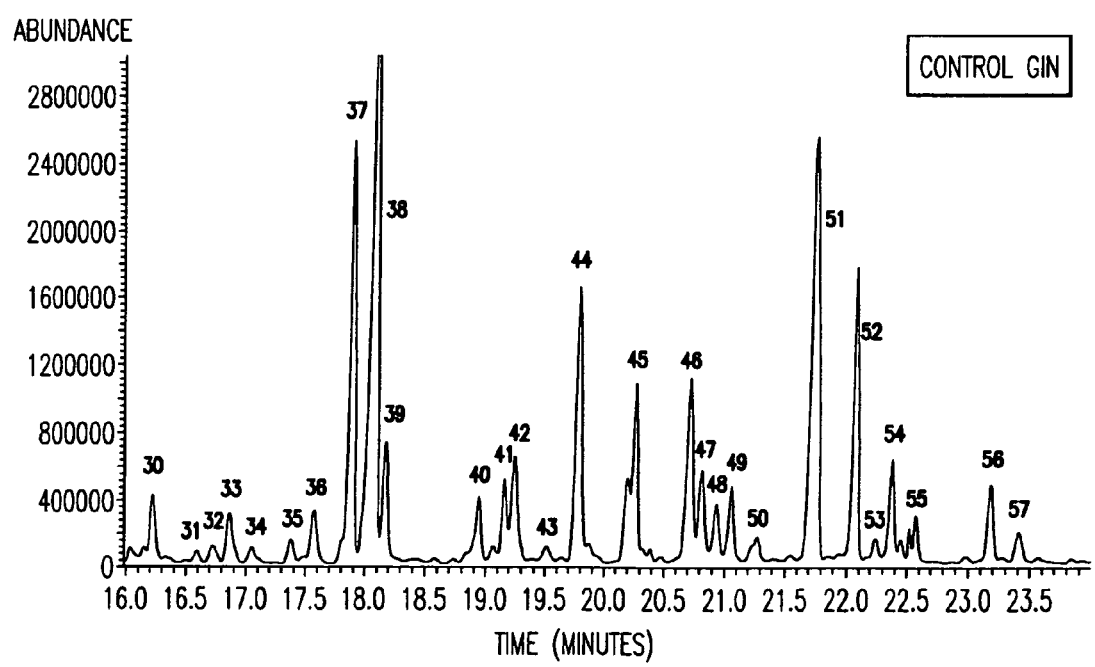
Figure 8A:
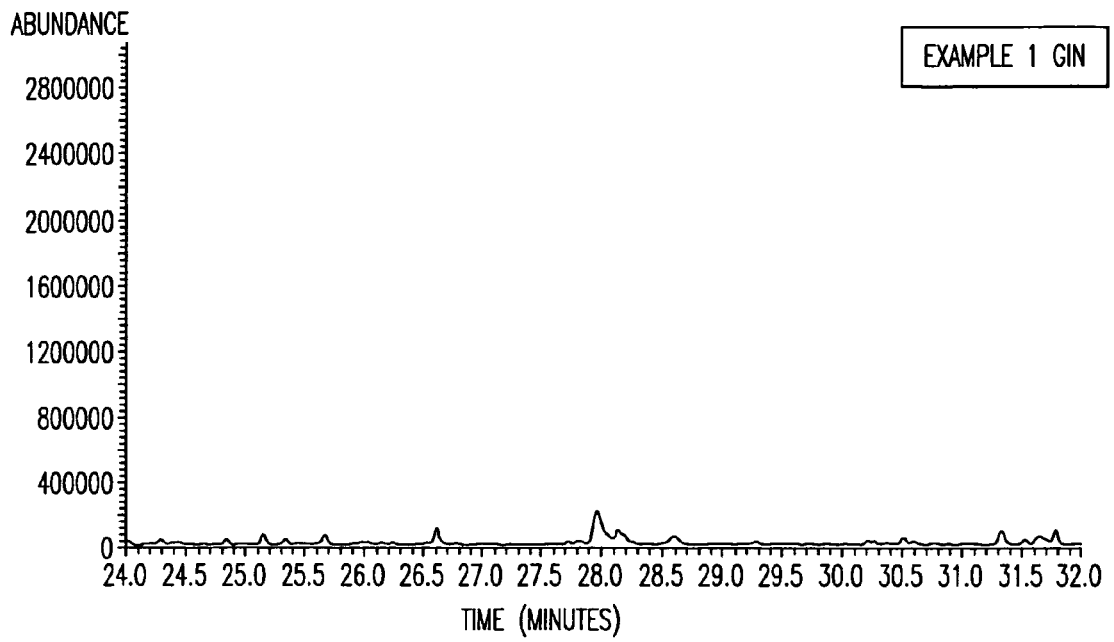
FIG. 8 shows an expanded portion of the abscissa of the FIG. 4 GC/MS data for a gin distilled under the reduced pressure method of the invention (Example 1 Gin, FIG. 8A) and a conventional gin (Control Gin, FIG. 8B).
Figure 8B:
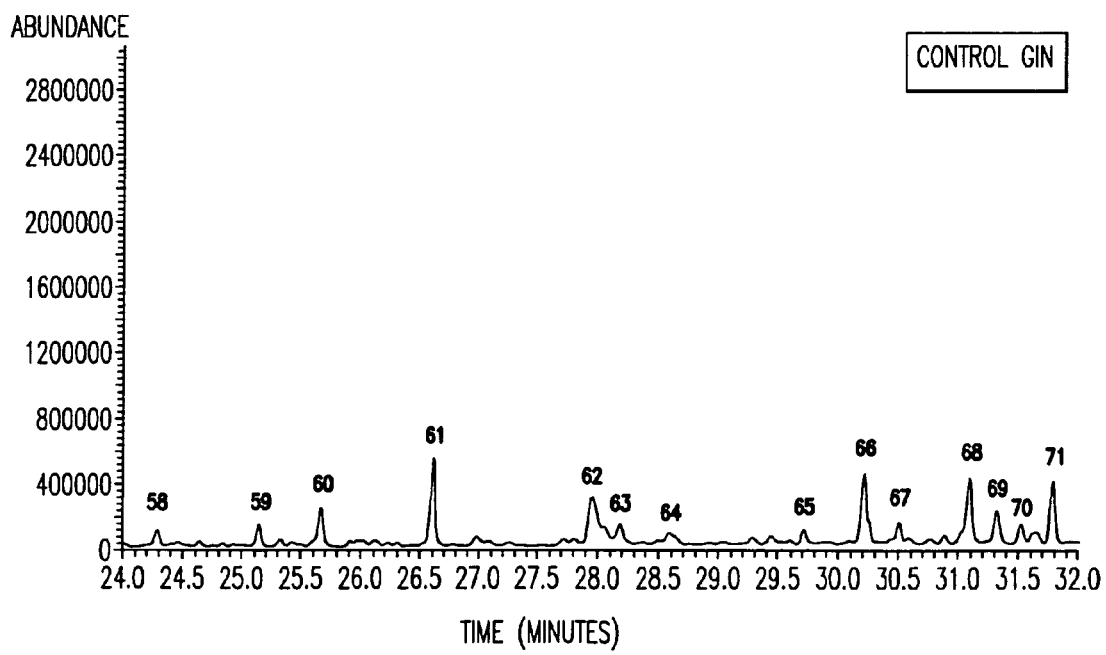
Figure 9A:
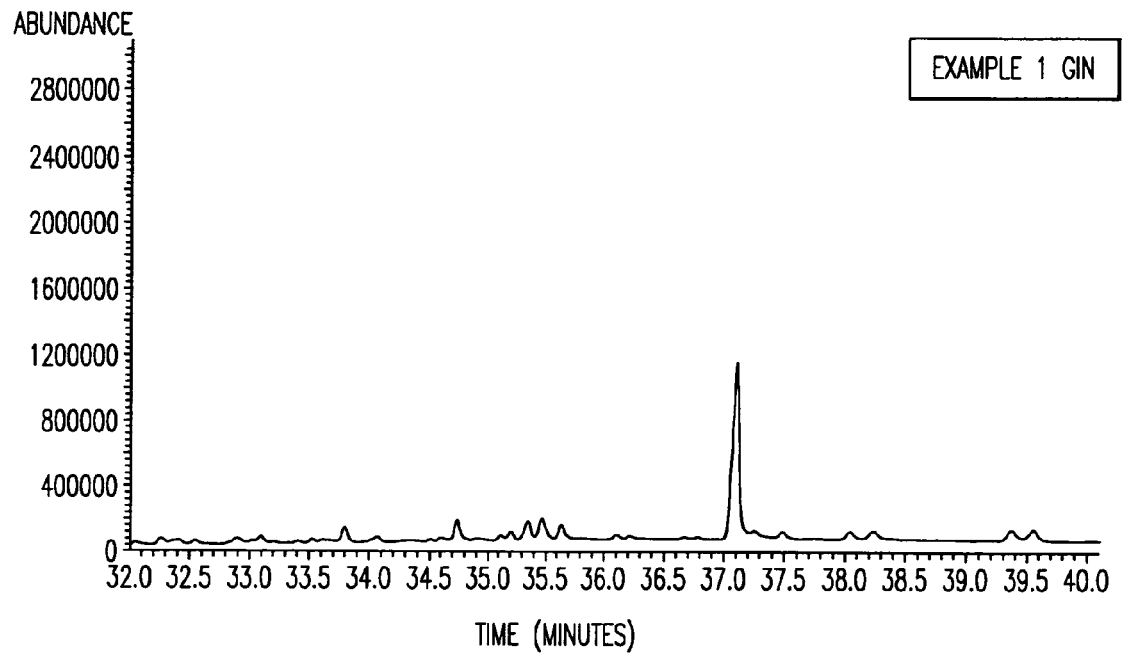
FIG. 9 shows an expanded portion of the abscissa of the FIG. 4 GC/MS data for a gin distilled under the reduced pressure method of the invention (Example 1 Gin, FIG. 9A) and a conventional gin (Control Gin, FIG. 9B).
Figure 9B:
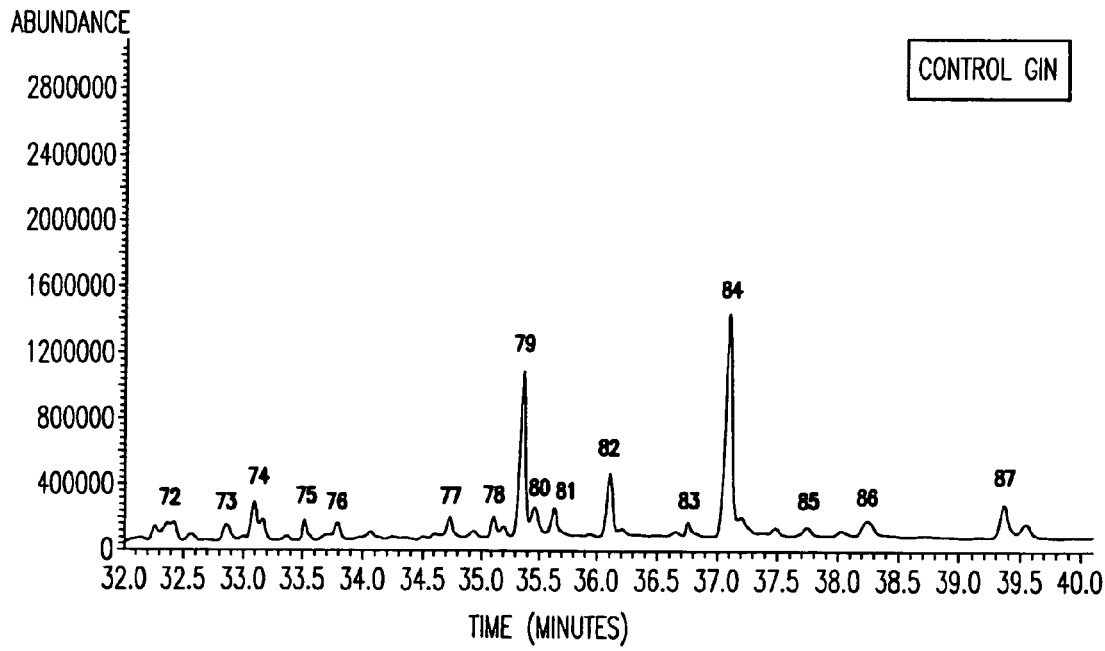
Figure 10A:
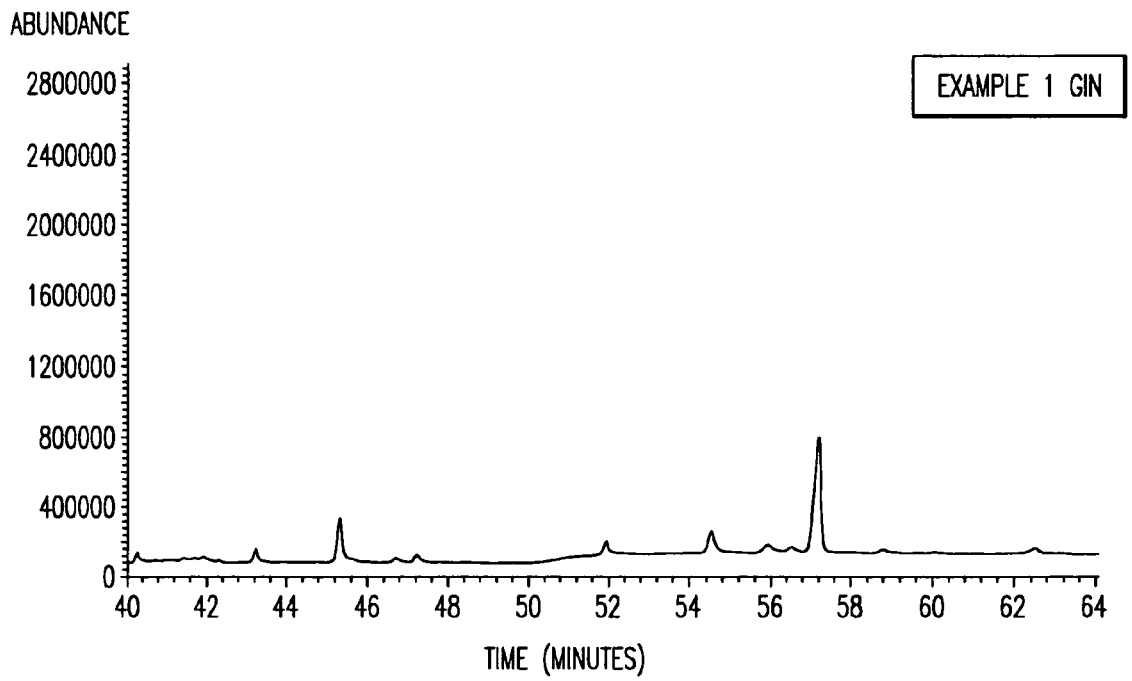
FIG. 10 shows an expanded portion of the abscissa of the FIG. 4 GC/MS data for a gin distilled under the reduced pressure method of the invention (Example 1 Gin, FIG. 10A) and a conventional gin (Control Gin, FIG. 10B).
Figure 10B:
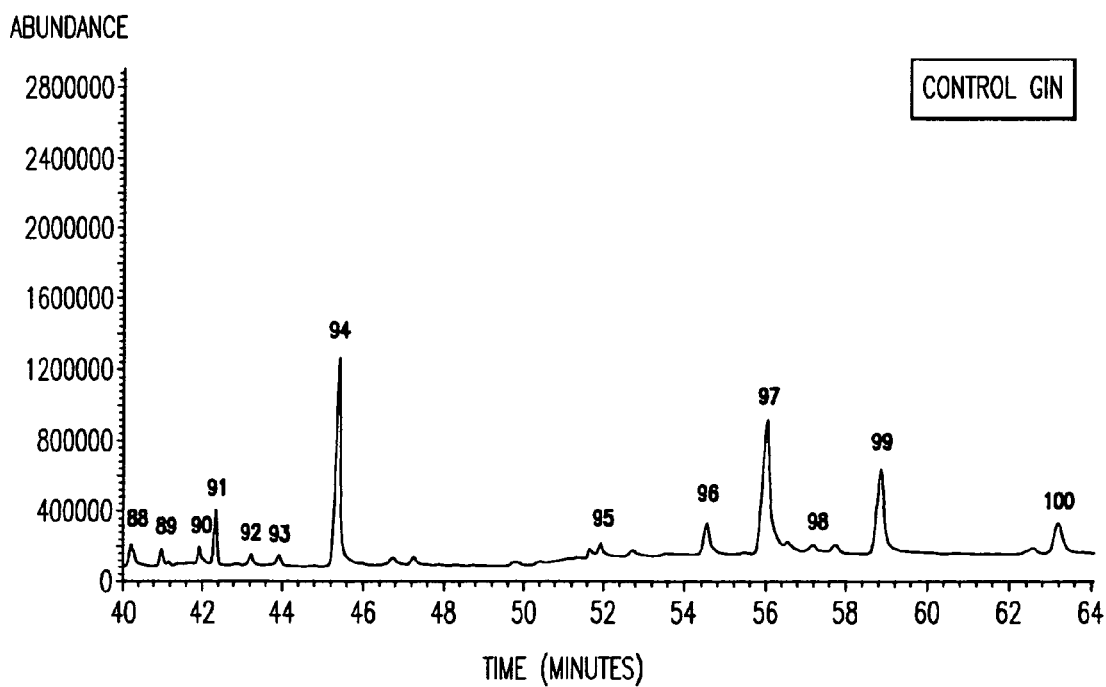

Each of FIGS. 5-10 provide an expanded portion of the abscissa of the GC/MS results in FIG. 4. FIG. 5 provides comparative GC/MS fingerprints for times up to about 8 minutes. FIG. 6 provides comparative GC/MS fingerprints for times from about 8 minutes to about 16 minutes. FIG. 7 provides comparative GC/MS fingerprints for times from about 16 minutes to about 24 minutes. FIG. 8 provides comparative GC/MS fingerprints for times from about 24 minutes to about 32 minutes. FIG. 9 provides comparative GC/MS fingerprints for times from about 32 minutes to about 40 minutes. FIG. 10 provides comparative GC/MS fingerprints for times from about 40 minutes to about 64 minutes. The evidence in FIGS. 5-10 further highlights the differences in chemical components between the Example 1 Gin and the Control Gin.

Having performed GC/MS analysis to provide a fingerprint of the chemical components of each gin, as described above, the fingerprints were compared, qualitatively, for relative abundance of components present in one gin which differed in abundance in the other gin. For example, the reduction in the abundance of certain chemical components in the Example 1 Gin of the invention were demonstrated relative to the Control Gin (distilled under conventional heating conditions), such as for caryophyllene oxide (peak #61).

Example 6.8

Chemical Analysis of Gin of the Invention

A fluid alcoholic mixture, AM2, was prepared by admixing grain neutral spirits of 95% ABV with a simplified (relative to AM1) proprietary blend of four botanicals—juniper berries, coriander seeds, angelica root and lemon peel—then diluted to 85% ABV with demineralized water. 94° proof gin "A" of the invention was prepared from AM2 as described in Example 1. A control conventional gin "B" was also made from the AM2 alcoholic mixture by distilling under conventional heating conditions, i.e., at a temperature ranging from about 70° C. to about 90° C. at 1 atm, then adjusted to 94° proof by the addition of demineralized water.

In another set of determinations, each of these two gins was subjected to a quantitative GC/MS analysis similar to that described in Example 7 above in order to analyze the chemical components of each of the gins and their abundance. The AM2 starting alcoholic mixture from which each of A and B was made was also analyzed. Dodecane was added to each sample to provide an internal reference standard. A HP 6890 GC gas chromatograph (Agilent Technologies, Palo Alto, Calif.) with mass spectrometer detection (positive ion) was used for identification of the components. Additional replicate samples were analyzed on a Hewlett-Packard 5890 GC with flame ionization detection (Agilent Technologies, Palo Alto, Calif.) and a Kovats alkane index ($C_5$ through $C_{30}$) obtained from Restek (Bellefonte, Pa.). For each instrument, the analytical conditions were as follows. A 30 meter DB5 column with 5 meter silicon guard column from Restek was used. The internal diameter of the main column was 0.25 mm and the film thickness was 0.25 μm. The helium flow rate was 4 mL per minute with splitless injection. The injector and detector temperatures were each 225° C. and the oven temperature profile was 60° C. for 10 minutes followed by a linear 4° C./min increase to 225° C. with a final 30 min hold time at 225° C. The 6890 GC used Hewlett Packard CHEMSTATION (Agilent Technologies, Palo Alto, Calif.) software for peak integration. The 5890 GC used Perkin-Elmer TURBOCHROM (Perkin Elmer, Wellesley, Mass.) software for peak integration.

GC/MS conditions within this example were kept substantially constant for the analysis of A, B and AM2. The GC elution time at the maximum abundance (peak time) and the peak area was determined for each peak. The results are collected in Table 3 below.

The results above demonstrated the reduction in the abundance of certain chemical components in Gin A of the invention relative to Control Gin B. For example, the PAR for B divided by the PAR for AM2 ranges from about 6 (0.06/0.01 for camphene) or 9.5 (0.19/0.02 for 3-carene) to about 144 (14.39/0.10 for β-myrcene) or 200 (0.20/0.001 for β-2-carene). Thus, for every compound in Table 3, the conventional distillation at a temperature of at least about 60° C. by which the Control Gin B was made greatly increased the amount of that compound present in B over the starting alcoholic mixture AM2. In contrast, the PAR for A divided by the PAR for AM2 ranges from about 0.14 (0.02/0.14 for linalool) or 0.33 (0.02/0.06 for γ-terpinene) to about 2.3 (0.16/0.07 for β-phellandrene) or 2.5 (0.05/0.02 for caryophyllene). Thus, for every compound in Table 3, the reduced pressure distillation by which Gin A of the invention was made resulted in a far lower amount of that compound present in Gin A relative to starting material alcoholic mixture AM2 when compared to the amount of the same compound in Control Gin B also relative to AM2.

In particular, for the monoterpenes α-phellandrene, α-pinene, β-myrcene and caryophyllene, each of which is known to be able to react in the presence of heat to produce off flavors, there is about 52, 45, 65 and 48 times more, respectively, of monoterpene present in Control Gin B relative to Gin A of the invention (calculated as PAR for B divided by the PAR for A). Thus, a gin of the reduced pressure method of the present invention has a reduced amount of a monoterpene relative to a conventional gin.

TABLE 3

Quantitative GC/MS Analysis

| | AM2 | | | Control Gin B | | | Gin A of the Invention | | |
|---|---|---|---|---|---|---|---|---|---|
| | Peak Time (min) | Peak Area | Peak Area Ratio* | Peak Time (min) | Peak Area | Peak Area Ratio* | Peak Time (min) | Peak Area | Peak Area Ratio* |
| α-Phellandrene | 8.82 | 9904 | 0.01 | 8.83 | 65969 | 1.04 | 8.83 | 16810 | 0.02 |
| α-Pinene | 9.02 | 1052570 | 1.18 | 9.03 | 2959383 | 46.55 | 8.99 | 691891 | 1.02 |
| Camphene | 9.35 | 8630 | 0.01 | 9.33 | 38126 | 0.06 | 9.33 | 8532 | 0.01 |
| β-Phellandrene | 9.88 | 58439 | 0.07 | 9.87 | 394377 | 6.20 | 9.87 | 105959 | 0.16 |
| β-Pinene | 9.96 | 71187 | 0.08 | 9.95 | 234316 | 3.69 | 9.95 | 77497 | 0.11 |
| β-Myrcene | 10.21 | 86781 | 0.10 | 10.21 | 914961 | 14.39 | 10.20 | 147930 | 0.22 |
| 3-Carene | 10.64 | 16603 | 0.02 | 10.64 | 11991 | 0.19 | 10.63 | 17512 | 0.03 |
| δ-2-Carene | 10.78 | 505 | 0.001 | 10.76 | 12855 | 0.20 | 10.76 | 0 | 0.00 |
| Cymene | 10.93 | 31863 | 0.04 | 10.92 | 91422 | 1.44 | 10.92 | 20561 | 0.03 |
| d-Limonene | 11.00 | 97854 | 0.11 | 11.01 | 337324 | 5.31 | 11.01 | 110491 | 0.16 |
| γ-Terpinene | 11.60 | 57021 | 0.06 | 11.60 | 169060 | 2.66 | 11.59 | 14915 | 0.02 |
| +4-Carene | 12.17 | 3709 | 0.00 | 12.17 | 38457 | 0.60 | 12.16 | 7246 | 0.01 |
| Linalool | 12.36 | 126843 | 0.14 | 12.33 | 177682 | 2.79 | 12.32 | 13101 | 0.02 |
| Dodecane (IS) | 14.04 | 895280 | 1.00 | 14.04 | 63574 | 1.00 | 14.03 | 675365 | 1.00 |
| Cubene | 16.56 | 8784 | 0.01 | 16.56 | 46805 | 0.74 | 16.55 | 12747 | 0.02 |
| α-Copaene | 16.98 | 22400 | 0.03 | 17.01 | 62483 | 0.98 | 16.99 | 21068 | 0.03 |
| β-Elemene | 17.19 | 8120 | 0.01 | 17.20 | 70602 | 1.11 | 17.19 | 13253 | 0.02 |
| Isoledene | 17.41 | 3101 | 0.00 | 17.41 | 25533 | 0.40 | 17.40 | 6443 | 0.01 |
| Caryophyllene | 17.69 | 17554 | 0.02 | 17.70 | 154636 | 2.43 | 17.69 | 34467 | 0.05 |
| α-Humulene | 18.18 | 14757 | 0.02 | 18.19 | 103898 | 1.63 | 18.17 | 22530 | 0.03 |
| γ-Muurolene | 18.43 | 4763 | 0.01 | 18.44 | 31631 | 0.50 | 18.42 | 5798 | 0.01 |
| δ-Germacrene | 18.55 | 22892 | 0.03 | 18.56 | 260108 | 4.09 | 18.54 | 38667 | 0.06 |
| β-Selinene | 18.64 | 5068 | 0.01 | 18.65 | 34688 | 0.55 | 18.63 | 6678 | 0.01 |
| Valencene | 18.75 | 11441 | 0.01 | 18.76 | 67060 | 1.05 | 18.74 | 10079 | 0.01 |
| γ-Cadinene | 18.98 | 16205 | 0.02 | 18.97 | 33880 | 0.53 | 18.97 | 11994 | 0.02 |
| β-Germacrene | 19.62 | 5114 | 0.01 | 19.63 | 44900 | 0.71 | 19.61 | 3600 | 0.01 |

*Peak Area Ratio (PAR) is relative to the dodecane internal standard (IS)

Example 6.9

Blinded Taste Analysis of Gin

Five trained tasters each made, independently, a blind evaluation, i.e., samples identified only by a code unknown to the taster, of the organoleptic properties of Example 1 Gin of the invention made from AM1 (labeled "Example 1 Gin" in FIG. 4A), compared with a control gin, also made from AM1, from Example 7 (labeled "Control Gin" in FIG. 4B). The Control Gin was distilled under the conventional heating conditions described previously. Each aliquot of gin was diluted with 4 aliquots of demineralized water to form a 20% by volume solution prior to the evaluation of its organoleptic properties.

Relative to the Control Gin, the Example 1 Gin was unanimously described as having: less nasal pungency, more floral smell, stronger black licorice smell, less spicy taste, less juniper smell, and less aroma.

What is claimed is:

1. A method for distilling an alcoholic mixture, comprising:
    (a) reducing the pressure in a distillation vessel containing a liquid alcoholic mixture;
    (b) distilling at least a portion of the liquid alcoholic mixture at a liquid alcoholic mixture temperature below about 0° C. such that the liquid alcoholic mixture remains liquid while distilling to provide an alcoholic distillate; and
    (c) condensing at least a portion of the alcoholic distillate with a first condenser at a first condenser temperature of from about −269° C. to about −15° C. to provide a first alcoholic condensate.

2. The method of claim 1, wherein at least about 75 wt. % of the liquid alcoholic mixture is distilled at a liquid alcoholic mixture temperature below about 0° C.

3. The method of claim 2, wherein at least about 90 wt. % of the liquid alcoholic mixture is distilled at a liquid alcoholic mixture temperature below about 0° C.

4. The method of claim 1, wherein the pressure within the distillation vessel while distilling is from about 0.1 Torr to about 42 Torr.

5. The method of claim 4, wherein the pressure within the distillation vessel while distilling is from about 0.1 to about 2 Torr.

6. The method of claim 1, wherein at least a portion of the liquid alcoholic mixture is distilled at a liquid alcoholic mixture temperature of from about −35° C. to about 0° C.

7. The method of claim 1, further comprising decreasing the liquid alcoholic mixture temperature during step (b) while distilling.

8. The method of claim 7, further comprising providing sufficient heating to the liquid alcoholic mixture to keep the liquid alcoholic mixture liquid during step (b) while distilling.

9. The method of claim 1, wherein the method is a batch method.

10. The method of claim 1, wherein the method is a continuous method.

11. The method of claim 1, wherein the first condenser temperature is from about −269° C. to about −25° C.

12. The method of claim 11, wherein the first condenser temperature is from about −80° C. to about −30° C.

13. The method of claim 12, wherein the first condenser temperature is from about −45° C. to about −30° C.

14. The method of claim 11, wherein the first condenser temperature is about −196° C.

15. The method of claim 11, further comprising a second condenser having a second condenser temperature which provides a second alcoholic condensate, wherein the alcoholic distillate contacts the first condenser before contacting the second condenser.

16. The method of claim 15, wherein the first condenser temperature and the second condenser temperature are each about −196° C.

17. The method of claim 15, wherein the second condenser temperature is below the first condenser temperature.

18. The method of claim 17, wherein the first condenser temperature is from about −80° C. to about −25° C.

19. The method of claim 18, wherein the second condenser temperature is from about −269° C. to about −30° C.

20. The method of claim 19, wherein the second condenser temperature is from about −80° C. to about −30° C.

21. The method of claim 19, wherein the second condenser temperature is about −196° C.

22. The method of claim 1, further comprising packaging the first alcoholic condensate to provide an alcoholic beverage.

23. The method of claim 15, further comprising combining the first alcoholic condensate and the second alcoholic condensate to form a combined alcoholic condensate and packaging the combined alcoholic condensate to provide an alcoholic beverage.

24. A gin alcoholic beverage prepared by the method of claim 23, having a an amount of a monoterpene that is about 45 to 65 times less than the amount of the monoterpene present in a conventional gin made from the same liquid alcoholic mixture.

25. The gin alcoholic beverage of claim 24, wherein the monoterpene is selected from α-phellandrene, α-pinene, β-myrcene, caryophyllene, or any combination thereof.

26. An alcoholic beverage prepared by the method of claim 22.

27. A gin alcoholic beverage prepared by the method of claim 1, having an amount of a monoterpene present in the gin alcoholic beverage that is about 45 to 65 times less than the amount of the monoterpene present in a conventional gin made from the same liquid alcoholic mixture.

28. The gin alcoholic beverage of claim 27, wherein the monoterpene is selected from α-phellandrene, α-pinene, β-myrcene, caryophyllene, or any combination thereof.

29. A method for distilling an alcoholic mixture, comprising:
    (a) reducing the pressure in a distillation vessel containing a liquid alcoholic mixture such that the pressure within the distillation vessel while distilling is from about 0.1 Torr to about 2 Torr;
    (b) distilling at least a portion of the liquid alcoholic mixture at a liquid alcoholic mixture temperature of from about −35° C. to about 0° C. to provide an alcoholic distillate; and
    (c) condensing the alcoholic distillate with a first condenser at a first condenser temperature of from about −196° C. to about −30° C. to provide a first alcoholic condensate.

30. The method of claim 29, wherein at least about 90 wt. % of the liquid alcoholic mixture is distilled at a liquid alcoholic mixture temperature below about 0° C.

31. The method of claim 30, wherein the liquid alcoholic mixture comprises gin, vodka, rum, neutral spirits, or any combination thereof.

32. The method of claim 30, wherein the liquid alcoholic mixture is gin, vodka, rum, neutral spirits, or any combination thereof.

33. The method of claim 30, wherein the liquid alcoholic mixture comprises at least one flavorant, flavorant extract, colorant, colorant extract, blending material, blending material extract, essential oil, essential oil extract, or any combination thereof.

34. The method of claim 33, wherein the at least one flavorant material is juniper berries or the at least one flavorant extract is juniper berry extract.

35. The method of claim 29, further comprising packaging the first alcoholic condensate to provide an alcoholic beverage.

36. The method of claim 35, wherein the alcoholic beverage comprises gin or is gin.

37. An alcoholic beverage prepared by the method of claim 36.

38. The method of claim 35, wherein the alcoholic beverage comprises vodka or is vodka.

39. An alcoholic beverage prepared by the method of claim 38.

40. An alcoholic beverage prepared by the method of claim 35.

41. The method of claim 29, further comprising a second condenser having a second condenser temperature which provides a second alcoholic condensate, wherein the alcoholic distillate contacts the first condenser before contacting the second condenser.

42. The method of claim 41, wherein the first condenser temperature is from about −50° C. to about −30° C.

43. The method of claim 42, wherein the second condenser temperature is from about −196° C. to about −30° C.

44. The method of claim 41, further comprising combining the first alcoholic condensate and the second alcoholic condensate to form a combined alcoholic condensate and packaging the combined alcoholic condensate to provide an alcoholic beverage.

45. The method of claim 44, wherein the alcoholic beverage comprises gin or is gin.

46. The alcoholic beverage prepared by the method of claim 45, having a an amount of a monoterpene that is between 45 and 65 times less than the amount of the monoterpene present in a conventional gin made from the same liquid alcoholic mixture.

47. The gin alcoholic beverage of claim 46, wherein the monoterpene is selected from α-phellandrene, α-pinene, β-myrcene, caryophyllene, or any combination thereof.

48. The method of claim 44, wherein the alcoholic beverage comprises vodka or is vodka.

49. An alcoholic beverage prepared by the method of claim 48.

50. An alcoholic beverage prepared by the method of claim 44.

51. The alcoholic beverage prepared by the method of claim 29, having an amount of a monoterpene present in the alcoholic beverage that is between 45 and 65 times less than the amount of the monoterpene present in a conventional gin made from the same liquid alcoholic mixture.

52. The gin alcoholic beverage of claim 51, wherein the monoterpene is selected from α-phellandrene, α-pinene, β-myrcene, caryophyllene, or any combination thereof.

* * * * *